United States Patent
Hayashi et al.

(10) Patent No.: US 9,123,936 B2
(45) Date of Patent: Sep. 1, 2015

(54) SOLID OXIDE FUEL CELL APPARATUS

(75) Inventors: Chie Hayashi, Kani (JP); Hiroya Ishikawa, Aichi-gun (JP); Keizo Furusaki, Nagoya (JP); Yasuo Okuyama, Kasugai (JP); Yusuke Todo, Komaki (JP); Daisuke Komatsu, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 462 days.

(21) Appl. No.: 13/063,639

(22) PCT Filed: Oct. 2, 2009

(86) PCT No.: PCT/JP2009/067254
§ 371 (c)(1),
(2), (4) Date: Mar. 11, 2011

(87) PCT Pub. No.: WO2010/038869
PCT Pub. Date: Apr. 8, 2010

(65) Prior Publication Data
US 2011/0171554 A1    Jul. 14, 2011

(30) Foreign Application Priority Data
Oct. 2, 2008 (JP) .................................. 2008-257512

(51) Int. Cl.
*H01M 8/10* (2006.01)
*H01M 8/24* (2006.01)
(Continued)

(52) U.S. Cl.
CPC ................ *H01M 8/12* (2013.01); *H01M 8/248* (2013.01); *H01M 8/2425* (2013.01); *H01M 8/006* (2013.01); *H01M 2008/1293* (2013.01); *Y02E 60/521* (2013.01); *Y02E 60/525* (2013.01)

(58) Field of Classification Search
None
See application file for complete search history.

(56) References Cited

U.S. PATENT DOCUMENTS 6,696,185 B1    2/2004    Okamoto
2003/0235723 A1  12/2003   Simpkins et al.
(Continued)

FOREIGN PATENT DOCUMENTS

EP    1 416 569    5/2004
JP    63-162458    10/1988
(Continued)

OTHER PUBLICATIONS

Partial English language translation of JP 2007-141743, published Jun. 7, 2007.

(Continued)

*Primary Examiner* — Ula C Ruddock
*Assistant Examiner* — Daniel Gatewood
(74) *Attorney, Agent, or Firm* — Greenblum & Bernstein, P.L.C.

(57) ABSTRACT

[Means for Solution] A solid oxide fuel cell apparatus including a fuel cell having a plate-shaped first solid electrolyte, an anode provided on one side of the first solid electrolyte and coming in contact with fuel gas, and a cathode provided on the other side of the first solid electrolyte and coming in contact with oxidizer gas. The solid oxide fuel cell apparatus further includes a cell-follow-up deformation member located on at least one of opposite sides of the fuel cell with respect to a first stacking direction along which the anode, the first solid electrolyte, and the cathode are stacked together. The cell-follow-up deformation member deforms according to a deformation of the fuel cell on the basis of at least one of physical quantities including differential thermal expansion coefficient and differential pressure.

21 Claims, 20 Drawing Sheets

(51) Int. Cl.
*H01M 8/12* (2006.01)
*H01M 8/00* (2006.01)

(56) References Cited

U.S. PATENT DOCUMENTS

| | | |
|---|---|---|
| 2008/0044712 A1 | 2/2008 | Ko et al. |
| 2008/0050558 A1* | 2/2008 | Ohmori et al. ................ 428/141 |

FOREIGN PATENT DOCUMENTS

| | | | |
|---|---|---|---|
| JP | 9-22720 | | 1/1997 |
| JP | 2005-050691 | | 2/2005 |
| JP | 2005-353413 | | 12/2005 |
| JP | 2006-164680 | | 6/2006 |
| JP | 2007126321 | A * | 5/2007 |
| JP | 2007-141743 | | 6/2007 |
| JP | 2007141743 | A * | 6/2007 |
| JP | 4014855 | | 11/2007 |
| WO | 2007/105291 | | 9/2007 |
| WO | WO 2007105291 | A1 * | 9/2007 |

OTHER PUBLICATIONS

Partial English language translation of JP 2005-353413, published Dec. 22, 2005.
Partial English language translation of WO 2007/105291, published Sep. 20, 2007.
Partial English language translation of JP 2005-50691, published Feb. 24, 2005.
English language Abstract for JP 2003-151611, corresponding to JP4014855, published Nov. 28, 2007.
Partial English language translation of JP 63-162458, published Oct. 24, 1988.
International Search Report for PCT/JP2009/067254, mailed Dec. 8, 2009.
European Office Action dated Oct. 24, 2013 issued in counterpart European application No. 09 81 7901 (10 pages).

* cited by examiner

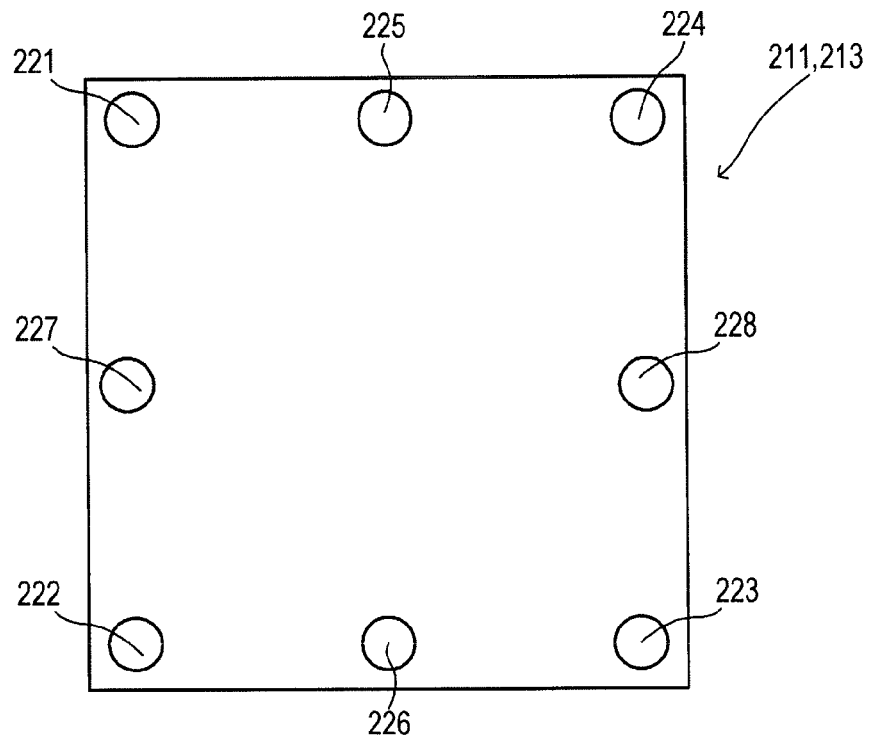
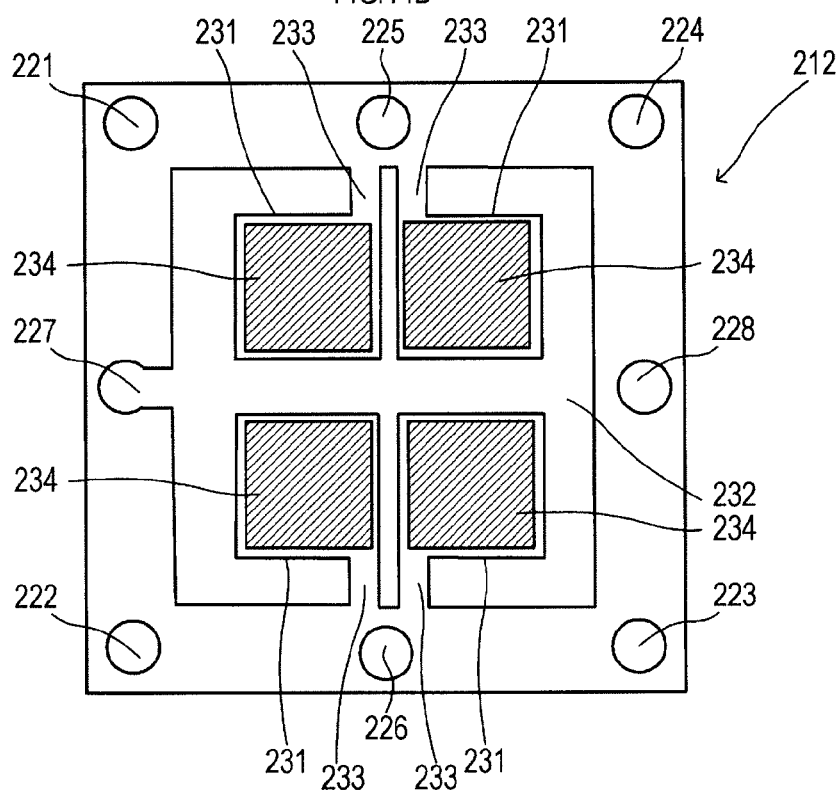

SOLID OXIDE FUEL CELL APPARATUS

TECHNICAL FIELD

The present invention relates to a solid oxide fuel cell apparatus (battery) which includes fuel cells each having an anode, a cathode, and a solid electrolyte.

BACKGROUND ART

Conventionally known fuel cell apparatus include a solid oxide fuel cell apparatus using solid electrolyte (solid oxide). The solid oxide fuel cell apparatus includes a fuel cell stack in which a large number of fuel cells are stacked together. Each of the fuel cells is configured, for example, such that a cathode and an anode are provided on respective opposite sides of a plate-shaped solid electrolyte. Air is supplied to the cathode, and fuel gas is supplied to the anode, whereby the fuel gas and oxygen contained in air react chemically with each other via the solid electrolyte, thereby generating electricity. The solid oxide fuel cell apparatus also includes current collectors which are in contact with respective anode and cathode electrically for establishing electrical communication among the fuel cells.

Meanwhile, a thermal cycle which the solid oxide fuel cell apparatus is subjected to in the course of operation or the like causes warpage to the fuel cells. Specifically, because of a poor match in thermal expansion coefficient between an anode and solid electrolyte, in the course of operation, the anode of the fuel cells become warped. As a result, there arises a problem in that reliability in electrical contact between the fuel cells and the current collectors is impaired. In order to solve the problem, according to a known fuel cell apparatus (refer to, for example, Patent Document 1), an end plate having a spherical portion for pressing a fuel cell stack is disposed on each of opposite sides, with respect to a stacking direction, of the fuel cell stack, and a flat spring of metal is disposed between the fuel cells. In such a fuel cell apparatus, the spherical portion of each of the end plates functions to evenly apply surface pressure to the fuel cell stack from the end plate, and an elastic deformation of the flat spring absorbs a dimensional variation of each of the fuel cells, thereby ensuring the reliability of electrical contact between the fuel cells and the current collectors.

PRIOR ART DOCUMENT

Patent Document

Patent Document 1: Japanese Patent No. 4014855

SUMMARY OF THE INVENTION

Problems to be Solved by the Invention

However, in the fuel cell apparatus of aforementioned Patent Document 1, a repetition of a thermal cycle of the fuel cell apparatus causes a change in elasticity of the flat springs, so that the flat springs fail to be elastically deformed according to a deformation of the fuel cells. Thus, as a thermal cycle of the fuel cell apparatus is repeated, defective electrical communication is apt to arise between the fuel cells and the current collectors.

In the fuel cell apparatus of aforementioned Patent Document 1, the spherical portions of the end plates are formed of such a material that, when the fuel cell stack is pressed, the spherical portions are not deformed. That is, the end plates fail to vary a force of pressing the fuel cell stack according to a deformation of the fuel cells. In other words, according to Patent Document 1, a purpose of the end plates is to maintain a force of pressing the fuel cell stack at a predetermined value, so that the end plates cannot actively vary the force according to a deformation of the fuel cells.

The present invention has been conceived in view of the above problems, and an object of the invention is to provide a solid oxide fuel cell apparatus capable of restraining the occurrence of defective electrical communication, which could otherwise result from a deformation of fuel cells caused by a repetition of a thermal cycle of the solid oxide fuel cell apparatus, thereby improving the reliability of electrical contact.

Means for Solving the Problems

To achieve the above object, the present invention provides a solid oxide fuel cell apparatus comprising a fuel cell having a plate-shaped first solid electrolyte, an anode provided on one side of the first solid electrolyte and coming in contact with fuel gas, and a cathode provided on the other side of the first solid electrolyte and coming in contact with oxidizer gas. The solid oxide fuel cell apparatus further comprises a cell-follow-up deformation member located on at least one of opposite sides of the fuel cell with respect to a first stacking direction along which the anode, the first solid electrolyte, and the cathode are stacked together. The cell-follow-up deformation member deforms according to a deformation of the fuel cell on the basis of at least one of physical quantities including differential thermal expansion coefficient and differential pressure.

In the thus-configured solid oxide fuel cell apparatus, when a repetition of a thermal cycle of the solid oxide fuel cell apparatus causes warpage to a laminate of the first solid electrolyte and the anode (hereinafter, may be referred to as the intra-cell laminate) in the fuel cell, the cell-follow-up deformation member warps according to warpage of the fuel cell on the basis of physical quantities including differential thermal expansion coefficient and/or differential pressure.

Warpage of the intra-cell laminate causes a reduction in a contact area between the anode of the intra-cell laminate and a current collector in contact with the anode, as well as a reduction in a contact area between the cathode and a current collector in contact with the cathode.

Meanwhile, as a result of warpage of the cell-follow-up deformation member, the cell-follow-up deformation member presses the fuel cell. This pressing can cause the intra-cell laminate of the fuel cell or the collectors to deform in such a manner as to increase a contact area between the anode and the current collector as well as a contact area between the cathode and the current collector. Thus, there can be restrained the occurrence of defective electrical communication between the anode and the current collector and defective electrical communication between the cathode and the current collector, which could otherwise result from warpage of the intra-cell laminate, whereby the reliability of electrical contact can be improved.

Also, when a thermal cycle of the fuel cell apparatus is repeated, the cell-follow-up deformation member can press the fuel cell while deforming according to a deformation of the intra-cell laminate more reliably than can a flat spring (e.g., Patent Document 1). That is, the cell-follow-up deformation member can deform the intra-cell laminate or the current collectors so as to increase a contact area between the anode and the current collector as well as a contact area between the cathode and the current collector more reliably than can the flat spring. Thus, as compared with the case where the flat spring is used to press the fuel cell, there can be more reliably restrained the occurrence of defective electrical communication between the anode and the current collector and defective electrical communication between the cathode and the current collector, which could otherwise result from a repetition of a thermal cycle of the fuel cell apparatus, whereby the reliability of electrical contact in the fuel cell apparatus can be improved.

Specifically, the solid oxide fuel cell apparatus may be configured as follows: the cell-follow-up deformation member comprises an electricity-nongenerating laminate configured such that a plate-shaped second solid electrolyte and a plate-shaped different-thermal-expansion member are laminated together, the different-thermal-expansion member being provided on one side of the second solid electrolyte and having a thermal expansion coefficient different from that of the second solid electrolyte, and configured so as not to contribute to electricity generation; and a plate-shaped electrically conductive member whose one side is in contact with the fuel cell and whose other side is in contact with the electricity-nongenerating laminate.

In the thus-configured solid oxide fuel cell apparatus, when a repetition of a thermal cycle of the solid oxide fuel cell apparatus causes warpage to a laminate of the first solid electrolyte and the anode (intra-cell laminate) in the fuel cell, the electricity-nongenerating laminate of the cell-follow-up deformation member warps according to warpage of the intra-cell laminate. The intra-cell laminate warps for the following reason: since the first solid electrolyte and the anode have different thermal expansion coefficients, stress is generated from differential thermal expansion between the first solid electrolyte and the anode which are laminated together. Similarly, the electricity-nongenerating laminate warps for the following reason: since the second solid electrolyte and the different-thermal-expansion member have different thermal expansion coefficients, stress is generated from differential thermal expansion between the second solid electrolyte and the different-thermal-expansion member which are laminated together.

Warpage of the intra-cell laminate causes a reduction in a contact area between the anode of the intra-cell laminate and the current collector in contact with the anode, as well as a reduction in a contact area between the cathode and the current collector in contact with the cathode.

Meanwhile, as a result of warpage of the electricity-nongenerating laminate, the electricity-nongenerating laminate presses the fuel cell. This pressing can cause the current collectors or the intra-cell laminate in the fuel cell to deform in such a manner as to increase a contact area between the anode and the current collector as well as a contact area between the cathode and the current collector. Thus, there can be restrained the occurrence of defective electrical communication between the anode and the current collector and defective electrical communication between the cathode and the current collector, which could otherwise result from warpage of the intra-cell laminate.

Further, similar to the case of the first solid electrolyte of the intra-cell laminate in the fuel cell, solid electrolyte is used to form the second solid electrolyte of the electricity-nongenerating laminate. In comparison of a change in the degree of deformation caused by a repetition of a thermal cycle of the fuel cell apparatus among the first solid electrolyte (intra-cell laminate), the second solid electrolyte (electricity-nongenerating laminate), and a flat spring (e.g., Patent Document 1), a change in the degree of deformation of the second solid electrolyte (electricity-nongenerating laminate) is more similar to a change in the degree of deformation of the first solid electrolyte (intra-cell laminate) than to a change in the degree of deformation of the flat spring. This is because materials of the same kind; i.e., solid electrolyte, are used to form the first solid electrolyte (intra-cell laminate) and the second solid electrolyte (electricity-nongenerating laminate), whereas the flat spring is formed of a material different from that of the first solid electrolyte (intra-cell laminate).

Thus, when a thermal cycle of the fuel cell apparatus is repeated, the electricity-nongenerating laminate can press the fuel cell while deforming according to a deformation of the intra-cell laminate more reliably than can the flat spring. That is, the electricity-nongenerating laminate can deform the intra-cell laminate or the current collectors so as to increase a contact area between the anode and the current collector as well as a contact area between the cathode and the current collector more reliably than can the flat spring. Thus, as compared with the case where the flat spring is used to press the fuel cell, there can be more reliably restrained the occurrence of defective electrical communication between the anode and the current collector and defective electrical communication between the cathode and the current collector, which could otherwise result from a repetition of a thermal cycle of the fuel cell apparatus, whereby the reliability of electrical contact in the fuel cell apparatus can be improved.

Meanwhile, since the solid oxide fuel cell apparatus of the present invention has the plate-shaped electrically conductive member whose one side is in contact with the fuel cell and whose other side is in contact with the electricity-nongenerating laminate, electricity generated in the fuel cell can be led out via the electrically conductive member. Also, the plate-shaped electrically conductive member can also serve as a current collector (e.g., current-collecting plate or interconnector) of the fuel cell.

Further, in the solid oxide fuel cell apparatus of the present invention, as mentioned above, the electricity-nongenerating laminate deforms according to a deformation of the intra-cell laminate, thereby pressing the fuel cell. That is, by use of only the electricity-nongenerating laminate (cell-follow-up deformation member), the solid oxide fuel cell apparatus of the present invention can implement a function which the fuel cell apparatus of aforementioned Patent Document 1 implements by use of the end plate and the flat spring. Thus, as compared with the fuel cell apparatus of Patent Document 1, the solid oxide fuel cell apparatus of the present invention can simplify a configuration for restraining the occurrence of the above-mentioned defective electrical communication.

The solid oxide fuel cell apparatus of the present invention may be configured as follows: in the case of provision of a fuel cell stack in which a plurality of the fuel cells are stacked, the electricity-nongenerating laminate (cell-follow-up deformation member) is disposed on at least one of opposite sides of the fuel cell stack with respect to a second stacking direction along which the fuel cells of the fuel cell stack are stacked together.

Also, the solid oxide fuel cell apparatus of the present invention may be configured as follows: in the case where the electricity-nongenerating laminate is disposed on each of opposite sides of the fuel cell stack, when a direction from the different-thermal-expansion member toward the second solid electrolyte along a third stacking direction along which the second solid electrolyte and the different-thermal-expansion member of the electricity-nongenerating laminate are stacked together is defined as a laminate stacking orientation, the electricity-nongenerating laminate disposed on one side of the fuel cell stack and the electricity-nongenerating laminate disposed on the other side of the fuel cell stack have the same laminate stacking orientation or opposite laminate stacking orientations.

Imparting the same laminate stacking orientation to the electricity-nongenerating laminates is advantageous in view of the following phenomenon. In the fuel cell stack in which a plurality of the fuel cells are stacked, the fuel cells located at a central portion of the fuel cell stack with respect to the above-mentioned second stacking direction are less susceptible to defective electrical communication between the anode and the current collector and defective electrical communication between the cathode and the current collector than are the fuel cells located at opposite end portions of the fuel cell stack with respect to the second stacking direction.

The fuel cells of the above-mentioned central portion differ from the fuel cells of the above-mentioned opposite end portions in that the fuel cell having the same laminate stacking orientation is disposed on each of opposite sides of the fuel cells of the central portion, whereas the fuel cell having the same laminate stacking orientation is disposed on only a single side of each of the fuel cells of the opposite end portions. That is, conceivably, the fuel cells disposed above a certain fuel cell of the central portion are warped similarly to the fuel cell of the central portion and press, in the manner of weights, the fuel cell of the central portion.

Thus, by means of disposing the electricity-nongenerating laminate having the same laminate stacking orientation on a side of each of the fuel cells of the above-mentioned opposite end portions opposite a side on which the fuel cell is disposed, the fuel cells of the opposite end portions can be brought into a state similar to that of the fuel cells of the above-mentioned central portion. Thus, conceivably, in the fuel cells of the opposite end portions, there can be restrained the occurrence of defective electrical communication between the anode and the current collector and defective electrical communication between the cathode and the current collector.

Meanwhile, the electricity-nongenerating laminate may have the same configuration as that of the fuel cells of the fuel cell stack; i.e., may have the anode, the first solid electrolyte, and the cathode; however, the electricity-nongenerating laminate is not allowed to contribute to an electricity-generating reaction, and functions as the cell-follow-up deformation member. The electricity-nongenerating laminate may be disposed at each of opposite end portions or a central portion of the fuel cell stack.

Imparting opposite laminate stacking orientations to the electricity-nongenerating laminates is advantageous for the following reason: both the electricity-nongenerating laminate disposed on one side of the fuel cell stack and the electricity-nongenerating laminate disposed on the other side can press the fuel cell stack through warpages thereof.

For example, in the case where the electricity-nongenerating laminate warps convexly toward the different-thermal-expansion member, by means of disposing the electricity-nongenerating laminate such that the different-thermal-expansion member faces the fuel cell stack, the electricity-nongenerating laminate can press the fuel cell stack through warpage thereof. In this case, the electricity-nongenerating laminate disposed on one side and the electricity-nongenerating laminate disposed on the other side are of opposite laminate stacking orientations. In the case where the electricity-nongenerating laminate warps convexly toward the second solid electrolyte, by means of disposing the electricity-nongenerating laminate such that the second solid electrolyte faces the fuel cell stack, the electricity-nongenerating laminate can press the fuel cell stack through warpage thereof. In this case, the electricity-nongenerating laminate disposed on one side and the electricity-nongenerating laminate disposed on the other side are of opposite laminate stacking orientations.

The solid oxide fuel cell apparatus of the present invention can be configured as follows: an electrically insulative member is provided on at least one of opposite sides of the electricity-nongenerating laminate with respect to the third stacking direction along which the second solid electrolyte and the different-thermal-expansion member of the electricity-nongenerating laminate are stacked together.

In the thus-configured solid oxide fuel cell apparatus, the provision of the electrically insulative member lowers the electron conductivity of the electricity-nongenerating laminates in the cell-follow-up deformation members disposed on opposite sides of the fuel cell stack, so that a current path detours in such a manner as to run along a periphery of the fuel cell stack; i.e., through the plate-shaped electrically conductive members as well as the electrically conductive members which two-dimensionally surround the respective electricity-nongenerating laminates. Thus, an appropriate electrical resistance can be imparted to the electricity-nongenerating laminates. Therefore, as compared with fuel cells located at opposite end portions of a fuel cell stack not having the cell-follow-up deformation members at the opposite end portions, the fuel cells adjacent to the cell-follow-up deformation members disposed at opposite end portions of the fuel cell stack can generate more Joule heat through flow of current in the course of generation of electricity. As a result, a tendency for opposite end portions of the fuel cell stack to become lower in temperature than the interior (particularly, a central portion) of the fuel cell stack is avoided, thereby contributing to establishment of temperature uniformity of the entire fuel cell stack. This feature is particularly effective when a material having ion conductivity and electron conductivity, such as GDC (gadolinium-doped ceria), is used to form the second solid electrolyte of the electricity-nongenerating laminate.

Meanwhile, the solid oxide fuel cell apparatus of the present invention can be configured as follows: in the case where the electricity-nongenerating laminate is disposed in the interior of the fuel cell stack with respect to a second stacking direction along which the fuel cells of the fuel cell stack are stacked together, the electricity-nongenerating laminate has a region where the second solid electrolyte is not formed, on a surface of the different-thermal-expansion member which is in contact with the second solid electrolyte.

In the thus-configured solid oxide fuel cell apparatus, as a result of warpage of the electricity-nongenerating laminate, the different-thermal-expansion member and the above-mentioned plate-shaped electrically conductive member come into contact with each other in the region where the second solid electrolyte is not formed, thereby allowing current to flow to the fuel cell stack through the electricity-nongenerating laminate. Shortening a current path in this manner restrains the generation of Joule heat in the interior (particularly, a central portion) of the fuel cell stack, whereby temperature uniformity of the entire fuel cell stack can be improved. This feature is particularly effective when an electrically insulative material having ion conductivity, such as zirconia, is used to form the second solid electrolyte of the electricity-nongenerating laminate.

Preferably, in the solid oxide fuel cell apparatus of the present invention, the second solid electrolyte is formed of the same material as that used to form the first solid electrolyte.

In the thus-configured solid oxide fuel cell apparatus, when a thermal cycle of the fuel cell apparatus is repeated, the electricity-nongenerating laminate of the cell-follow-up deformation member can press the fuel cell while deforming according to a deformation of the intra-cell laminate more reliably than in the case where the second solid electrolyte member is formed of a material different from that used to form the first solid electrolyte. Thus, there can be more reliably restrained the occurrence of defective electrical communication between the anode and the current collector and defective electrical communication between the cathode and the current collector, which could otherwise result from a repetition of a thermal cycle of the fuel cell apparatus, whereby the reliability of electrical contact in the fuel cell apparatus can further be improved.

Preferably, in the solid oxide fuel cell apparatus of the present invention, the electricity-nongenerating laminate has the same shape as that of a laminate of the first solid electrolyte and the anode (intra-cell laminate).

In the thus-configured solid oxide fuel cell apparatus, when a thermal cycle of the fuel cell apparatus is repeated, the electricity-nongenerating laminate can press the fuel cell while deforming according to a deformation of the intra-cell laminate more reliably than in the case where the electricity-nongenerating laminate has a shape different from that of the intra-cell laminate. Thus, there can be more reliably restrained the occurrence of defective electrical communication between the anode and the current collector and defective electrical communication between the cathode and the current collector, which could otherwise result from a repetition of a thermal cycle of the fuel cell apparatus, whereby the reliability of electrical contact in the fuel cell apparatus can further be improved.

Preferably, in the solid oxide fuel cell apparatus of the present invention, the different-thermal-expansion member is formed of the same material as that used to form the anode.

In the thus-configured solid oxide fuel cell apparatus, when a thermal cycle of the fuel cell apparatus is repeated, the electricity-nongenerating laminate can press the fuel cell while deforming according to a deformation of the intra-cell laminate more reliably than in the case where the different-thermal-expansion member is formed of a material different from that used to form the anode. Thus, there can be more reliably restrained the occurrence of defective electrical communication between the anode and the current collector and defective electrical communication between the cathode and the current collector, which could otherwise result from a repetition of a thermal cycle of the fuel cell apparatus, whereby the reliability of electrical contact in the fuel cell apparatus can further be improved.

In the solid oxide fuel cell apparatus of the present invention, the different-thermal-expansion member may be formed of a single-component material or a multi-component material. The multi-component material means a material prepared by mixing different single-component materials. In the case where the different-thermal-expansion member is formed of a material of a mixed composition, the magnitude of warpage (the degree of deformation) of the different-thermal-expansion member (electricity-nongenerating laminate) can be adjusted by means of changing the component ratio of a mixed composition; i.e., changing a combination of materials of different compositions or the mixing ratio of materials of different compositions. The degree of deformation is an absolute quantity of warpage or the ratio of warpage to warpage of the cell.

In the solid oxide fuel cell apparatus of the present invention, the different-thermal-expansion member may be formed such that a plurality of thin films (green sheets) are laminated together.

In the thus-configured solid oxide fuel cell apparatus, the thickness of the different-thermal-expansion member can be changed with the number of green sheets to be laminated together, the green sheets being used to form respective thin films. The strength and the magnitude of warpage of the electricity-nongenerating laminate including the different-thermal-expansion member can be changed with the thickness of the different-thermal-expansion member. That is, by an easy method of changing the number of thin films to be laminated together, the strength and the magnitude of warpage of the electricity-nongenerating laminate can be adjusted. Further, by combining use of materials of mixed compositions prepared through mixing of materials of different compositions and employment of lamination of a plurality of thin films, the different-thermal-expansion member can be configured such that the thin film layers are formed of respective materials of different compositions.

In the solid oxide fuel cell apparatus of the present invention, the different-thermal-expansion member may be greater in warpage than the anode.

In the thus-configured solid oxide fuel cell apparatus, the electricity-nongenerating laminate having the different-thermal-expansion member warps to a greater degree than the fuel cell (intra-cell laminate) having the anode. Accordingly, a force of the electricity-nongenerating laminate pressing the fuel cell increases; thus, the electricity-nongenerating laminate can cause the intra-cell laminate or the current collectors to deform such that the contact area between the anode and the current collector and that between the cathode and the current collector are increased further.

The solid oxide fuel cell apparatus of the present invention may have the following alternative configuration: the cell-follow-up deformation member comprises an electricity-nongenerating laminate configured such that a plate-shaped first member and a plate-shaped different-thermal-expansion member are laminated together, the different-thermal-expansion member being provided on one side of the first member and having a thermal expansion coefficient different from that of the first member, and configured so as not to contribute to electricity generation; and a plate-shaped electrically conductive member whose one side is in contact with the fuel cell and whose other side is in contact with the electricity-nongenerating laminate.

In the thus-configured solid oxide fuel cell apparatus, since the first member and the different-thermal-expansion member have different thermal expansion coefficients, stress is generated from differential thermal expansion between the first member and the different-thermal-expansion member which are laminated together, and thus the electricity-nongenerating laminate warps and presses the fuel cell. This pressing can restrain the occurrence of defective electrical communication between the anode and the current collector and defective electrical communication between the cathode and the current collector, which could otherwise result from warpage of the fuel cell caused by a repetition of a thermal cycle of the fuel cell apparatus.

In the solid oxide fuel cell apparatus of the present invention, the first member may be formed of a ceramic material or metal.

In the thus-configured solid oxide fuel cell apparatus, the range of material selection is expanded with respect to materials applicable to the first member and the different-thermal-expansion member, which are formed of materials having different thermal expansion coefficients. Thus, there can be fabricated the cell-follow-up deformation member which can deform more reliably according to a deformation of the fuel cell caused by a repetition of a thermal cycle of the fuel cell apparatus.

The solid oxide fuel cell apparatus of the present invention may have the following still alternative configuration: the cell-follow-up deformation member comprises a first metal plate serving as a platelike member of metal; a second metal plate serving as a platelike member of metal and disposed in opposition to the first metal plate; a gas chamber configured between the first metal plate and the second metal plate to allow introduction of auxiliary gas thereinto; and a spacer member disposed within the gas chamber between the first metal plate and the second metal plate and adapted to prevent contact of the first metal plate with the second metal plate.

In the thus-configured solid oxide fuel cell apparatus, the cell-follow-up deformation member has the gas chamber configured between the first metal plate and the second metal plate to allow introduction of auxiliary gas thereinto. Also, the cell-follow-up deformation member is disposed adjacent to the fuel cell. Thus, in the case where the pressure of gas introduced into the gas chamber of the cell-follow-up deformation member is equal to or higher than the pressure of gas introduced into the fuel cell adjacent to the cell-follow-up deformation member, the first metal plate or the second metal plate disposed between the gas chamber and the fuel cell is deformed in such a manner as to fill a gap between the fuel cell and the first metal plate or the second metal plate; i.e., according to warpage of the fuel cell, thereby pressing the fuel cell. Since the deformation of the metal plate of the cell-follow-up deformation member is not an elastic deformation of the metal plate itself, but is generated by an external force induced by differential pressure between the gas chamber and the fuel cell, the metal plate is free from a change in elastic property, permanent set in fatigue, etc., which could otherwise result from a repetition of a thermal cycle. Thus, as compared with the case where a flat spring is used to press the fuel cell through utilization of elastic deformation of metal (e.g., Patent Document 1), there can be more reliably restrained the occurrence of defective electrical communication between the anode and the current collector and defective electrical communication between the cathode and the current collector, which could otherwise result from a repetition of a thermal cycle of the fuel cell apparatus, whereby the reliability of electrical contact in the fuel cell apparatus can be improved.

In the case where the pressure of gas introduced into the gas chamber of the cell-follow-up deformation member is equal to or lower than the pressure of gas introduced into the fuel cell adjacent to the cell-follow-up deformation member, the cell-follow-up deformation member does not deform in such a direction as to press the fuel cell. Even in such a case, when the fuel cell adjacent to the cell-follow-up deformation member is deformed in such a direction as to press the cell-follow-up deformation member, the first metal plate or the second metal plate disposed between the gas chamber and the fuel cell is deformed toward the gas chamber. Through such deformation of the first metal plate or the second metal plate, the first metal plate or the second metal plate fills a gap between the fuel cell and the first metal plate or the second metal plate according to the deformation of the fuel cell so as to absorb the deformation of the fuel cell. Thus, there can be restrained the occurrence of defective electrical communication between the anode and the current collector and defective electrical communication between the cathode and the current collector, whereby the reliability of electrical contact in the fuel cell apparatus can be improved.

The provision of the spacer member between the first metal plate and the second metal plate avoids contact between the first metal plate and the second metal plate. This solves a problem in that the first metal plate and the second metal plate come into contact with each other and seize in relation to each other at a high temperature, thereby avoiding the occurrence of crushing of a cavity of the gas chamber. Thus, the follow-up deformability of the cell-follow-up deformation member can be effectively maintained. This is particularly effective for a fuel cell apparatus used in a high-temperature environment, such as a solid oxide fuel cell apparatus. The term "follow-up deformability" means the following: the cell follow-up deformation member deforms according to a deformation of the fuel cell, thereby absorbing the deformation of the fuel cell and in turn improving the reliability of electrical contact between the fuel cell and the current collector.

In the case where the solid oxide fuel cell apparatus of the present invention comprises a fuel cell stack in which a plurality of the fuel cells are stacked, the cell-follow-up deformation member may be disposed on at least one of opposite sides of the fuel cell stack with respect to a second stacking direction along which the fuel cells of the fuel cell stack are stacked together.

In the solid oxide fuel cell apparatus of the present invention, the spacer member may be formed of an electrically insulative material.

The thus-configured solid oxide fuel cell apparatus can avoid the following condition: the spacer member and the first metal plate or the second metal plate seize in relation to each other in a state of contact, and a cavity of the gas chamber is crushed; as a result, the first metal plate or the second metal plate fails to deform according to a deformation of the fuel cell.

In the solid oxide fuel cell apparatus of the present invention, the spacer member may be formed of foam metal.

In the thus-configured solid oxide fuel cell apparatus, for example, since the spacer member formed of foam metal can deform more flexibly than can the spacer member formed of plate-shaped metal, the spacer member formed of foam metal can deform more reliably according to a deformation of the fuel cell.

In the case where the spacer member is formed of foam metal, in order to mitigate the condition in which the foam metal and the first or second metal plate seize in relation to each other, the foam metal may have an electrically insulative material provided on its surface in contact with the first metal plate and an electrically insulative material provided on its surface in contact with the second metal plate.

In the thus-configured solid oxide fuel cell apparatus, because of mitigation of the condition in which the foam metal and the first or second metal plate seize in relation to each other, the follow-up deformability of the cell-follow-up deformation member can be maintained more effectively.

In the solid oxide fuel cell apparatus of the present invention, an urging member may be provided at least between the first metal plate and the spacer member or between the second metal plate and the spacer member.

In the thus-configured solid oxide fuel cell apparatus, for example, the urging member, such as a coil spring, provided between the spacer member and the first metal plate or the second metal plate complements the follow-up deformability of the metal plate of the cell-follow-up deformation member, which is deformed by an external force induced by differential pressure between the gas chamber and the fuel cell, whereby the reliability of electrical contact between the fuel cell and the current collector can further be improved.

In the solid oxide fuel cell apparatus of the present invention, the spacer member may be an urging member.

In the thus-configured solid oxide fuel cell apparatus, while avoiding contact between the first metal plate and the second metal plate, the urging member serving as the spacer member functions to complement the follow-up deformability of the cell-follow-up deformation member, which is deformed by an external force induced by differential pressure between the gas chamber and the fuel cell, whereby the reliability of electrical contact between the fuel cell and the current collector can further be improved.

In the case where the solid oxide fuel cell apparatus of the present invention comprises a fuel cell stack in which a plurality of the fuel cells are stacked, and the cell-follow-up deformation member is disposed in the interior of the fuel cell stack with respect to a second stacking direction along which the fuel cells of the fuel cell stack are stacked together, the cell-follow-up deformation member may be configured such that the auxiliary gas can flow through the gas chamber.

In the thus-configured solid oxide fuel cell apparatus, as compared with the case where the auxiliary gas cannot flow through the gas chamber and thus stagnates within the gas chamber, heat transfer within the gas chamber is promoted, whereby an excessive increase in temperature in the interior of the fuel cell stack can be restrained.

In the case where the solid oxide fuel cell apparatus of the present invention comprises a fuel cell stack in which a plurality of the fuel cells are stacked, and the cell-follow-up deformation member is disposed on at least one of opposite sides of the fuel cell stack with respect to a second stacking direction along which the fuel cells of the fuel cell stack are stacked together, the cell-follow-up deformation member may be configured such that the auxiliary gas cannot flow through the gas chamber.

In the thus-configured solid oxide fuel cell apparatus, since the auxiliary gas introduced into the gas chamber stagnates within the gas chamber, thermal insulation effect is exhibited within the gas chamber, thereby contributing to establishment of temperature uniformity of the entire fuel cell stack, whose opposite end portions tend to become lower in temperature than the interior (particularly, a central portion) thereof.

In the solid oxide fuel cell apparatus of the present invention, the auxiliary gas may be the oxidizer gas or the fuel gas.

In the thus-configured solid oxide fuel cell apparatus, since gas utilized for electricity-generating reaction in the fuel cell stack can also be used as the auxiliary gas, there is no need to prepare gas of a separate system for use as the auxiliary gas.

BRIEF DESCRIPTION OF THE DRAWINGS

FIGS. 14A-14B Exploded plan views of the gas spring 204, 205 of the sixth embodiment.

DESCRIPTION OF REFERENCE NUMERALS

1: solid oxide fuel cell apparatus; 2: fuel cell; 3: fuel cell stack; 4, 5: end holder member; 11-14: bolt; 30: cell; 31: anode; 32: solid electrolyte; 33: cathode; 41: interconnector; 45: separator; 48, 49: current collector; 70: laminate; 71: solid electrolyte; 72: different-thermal-expansion member; 73: accommodation section; 75: electrically insulative layer; 76: hollow region; 81: lower frame; 82: central frame; 83: upper frame; 204, 205, 301, 401, 504, 505: gas spring; 211, 311, 511: upper frame; 212, 312, 512: central frame; 213, 313, 513: lower frame; 231, 331, 531: columnar member; 232, 332: opening portion; 233: joint portion; 234, 334, 534: alumina layer; 240, 340, 540: gas chamber; 405: coil spring; 5311: protrusion

MODES FOR CARRYING OUT THE INVENTION

First Embodiment

An embodiment of the present invention will next be described with reference to the drawings.

Figure 1:
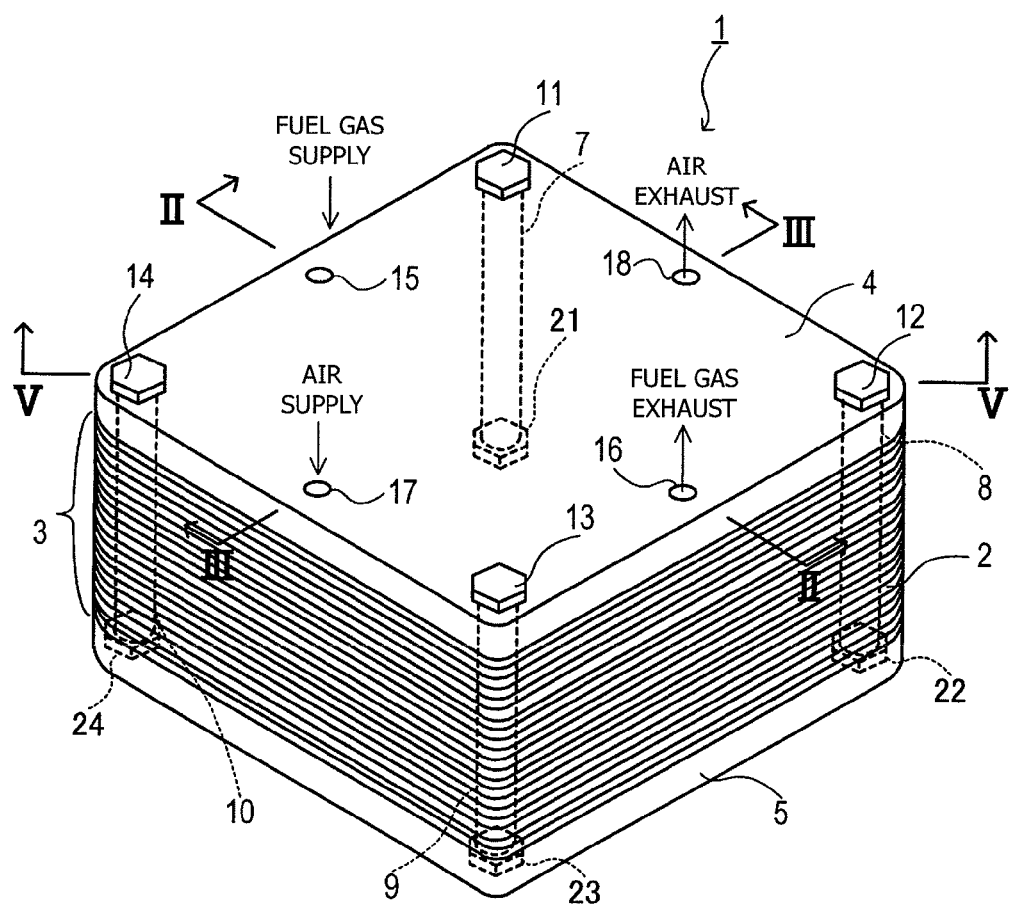
FIG. 1 Perspective view of a fuel cell apparatus 1 of a first embodiment.
Figure 2:
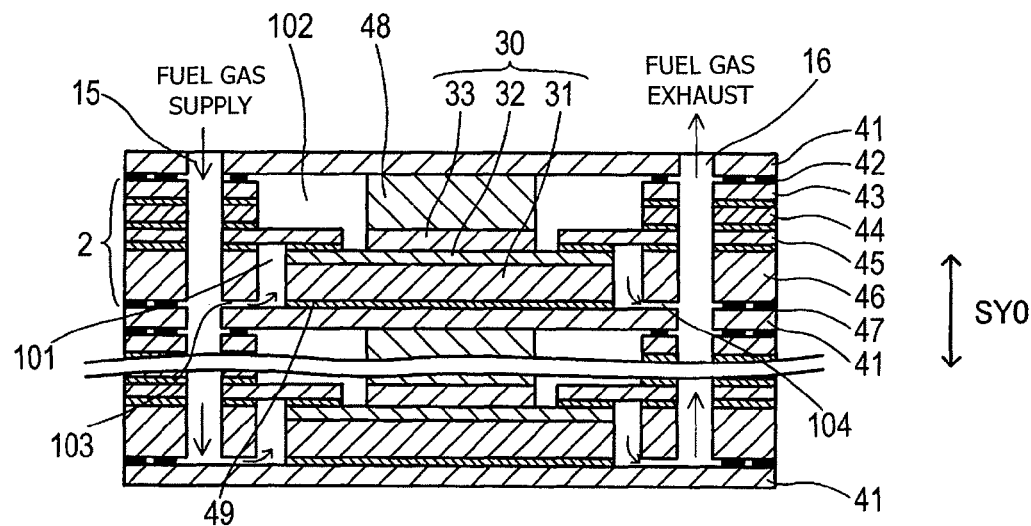
FIG. 2 Schematic sectional view of a fuel cell stack 3 of the first embodiment taken along line II-II of FIG. 1.
Figure 3:
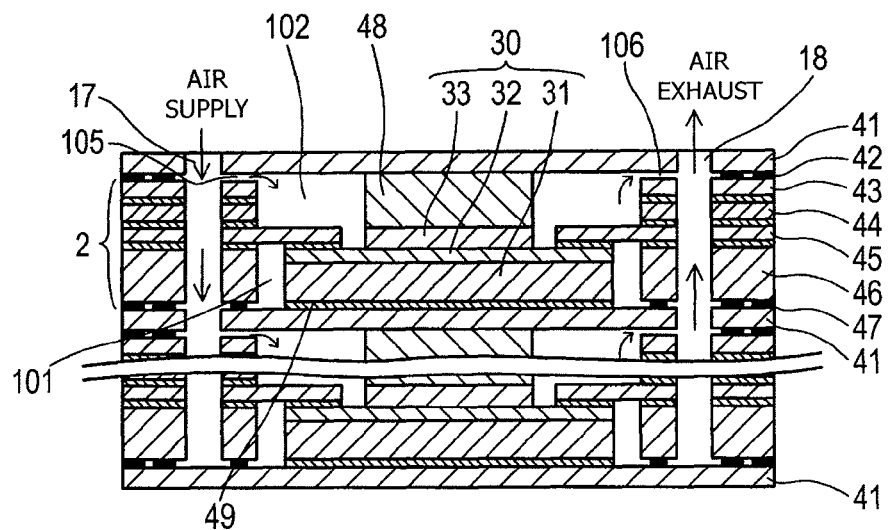
FIG. 3 Schematic sectional view of the fuel cell stack 3 of the first embodiment taken along line III-III of FIG. 1.
Figure 4:
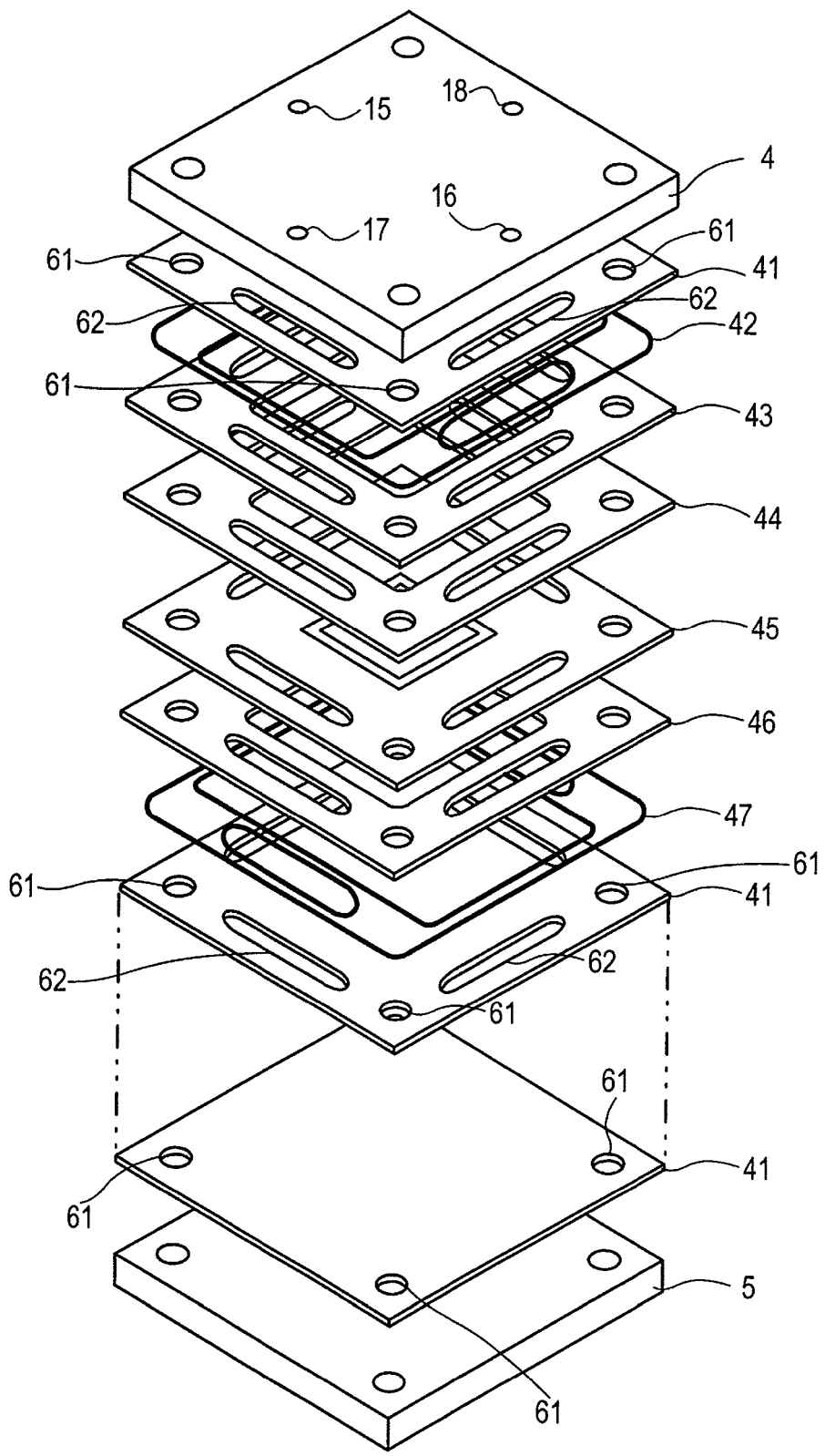
FIG. 4 Exploded perspective view showing the fuel cell apparatus 1 of the first embodiment.
Figure 5:
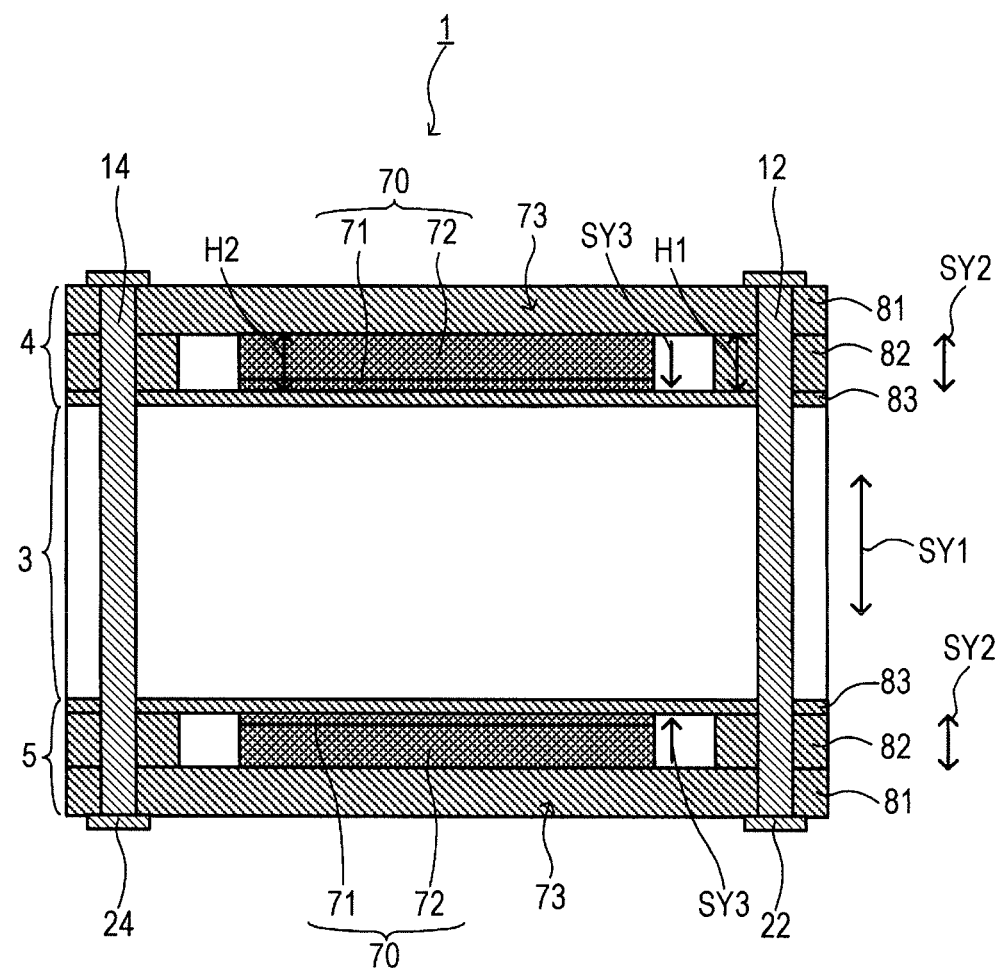
FIG. 5 Schematic sectional view of the first embodiment taken along line V-V of FIG. 1.
Figure 6A:
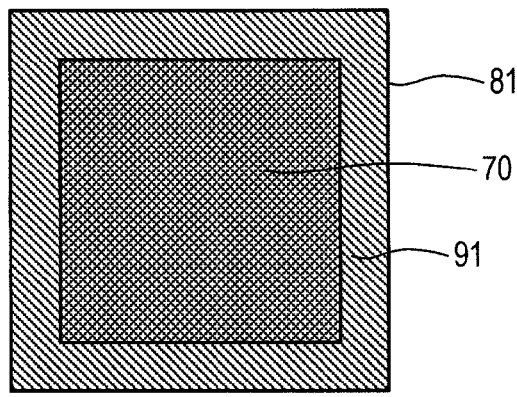
FIGS. 6A-6C Exploded plan views of an end holder member 4, 5 of the first embodiment.
Figure 6B:
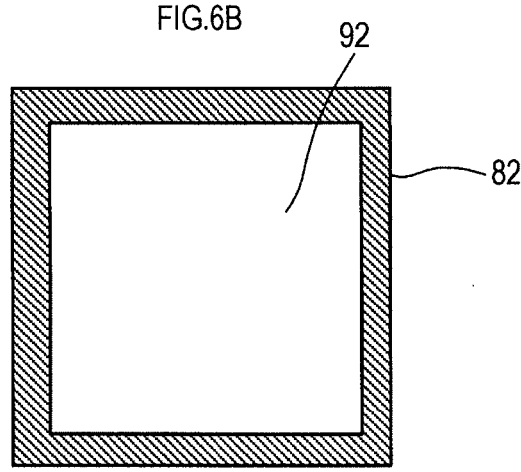
Figure 6C:
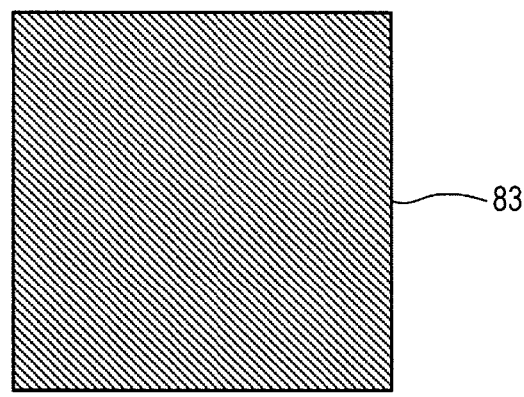

FIG. 1 is a perspective view of a solid oxide fuel cell apparatus 1 to which the present invention is applied; FIG. 2 is a schematic sectional view of a fuel cell stack 3 taken along line II-II of FIG. 1; FIG. 3 is a schematic sectional view of the fuel cell stack 3 taken along line III-III of FIG. 1; FIG. 4 is an exploded perspective view showing the solid oxide fuel cell apparatus 1; FIG. 5 is a schematic sectional view taken along line V-V of FIG. 1; and FIGS. 6A-6C are exploded plan views showing an end holder member (a cell-follow-up deformation member composed of an electricity-nongenerating laminate and a plate-shaped electrically conductive member) 4, 5.

As shown in FIG. 1, the solid oxide fuel cell apparatus (hereinafter, referred to merely as the fuel cell apparatus) 1 is adapted to generate electricity with fuel gas (e.g., hydrogen) and oxidizer gas (e.g., air (specifically, oxygen contained in air)) supplied thereto.

The fuel cell apparatus 1 includes the fuel cell stack 3 in which a plurality of (e.g., 20) solid oxide fuel cells (hereinafter, referred to merely as fuel cells) 2 are stacked; a pair of end holder members 4, 5 serving also as current collector plates (end plates) and disposed on opposite sides of the fuel cell stack 3 with respect to a stacking direction; and four bolts 11-14 of metal which extend through the fuel cell stack 3 and the end holder members 4, 5 along the stacking direction. The bolts 11-14 are inserted through respective bolt fixation holes 7-10 formed at four corners of the solid oxide fuel cell apparatus 1.

The fuel cell apparatus 1 has a fuel gas supply path 15 for supply of fuel gas and a fuel gas exhaust path 16 for discharge of fuel gas, as well as an air supply path 17 for supply of air and an air exhaust path 18 for discharge of air.

Nuts 21-24 are engaged with the bolts 11-14, respectively, and fastened, thereby fastening the end holder members 4, 5 vertically inward (inward along the stacking direction) in FIG. 1. Accordingly, the end holder members 4, 5 press the fuel cell stack 3 inward, thereby integrally fixing the fuel cell apparatus 1.

A fuel cell 2 is a so-called anode-support film-type cell. As shown in FIGS. 2 and 3, an anode 31 is disposed on a side toward a fuel gas flow channel 101; a solid electrolyte 32 in the form of a thin film is formed on the upper surface of the anode 31 in FIGS. 2 and 3; and a cathode 33 is formed on the surface of the solid electrolyte 32 located on a side toward an air flow channel 102. The anode 31, the solid electrolyte 32, and the cathode 33 which are formed integral with one another are collectively called a cell 30. A direction along which the anode 31, the solid electrolyte 32, and the cathode 33 are stacked together is called a stacking direction SY0 (see FIG. 2).

The fuel cell 2 further includes a cathode packing 42 of metal; a cathode frame 43 of metal; an electrically insulative frame 44 of ceramic; a separator 45 of metal, to which the cell 30 is bonded at the center thereof and which is adapted to shut off a gas flow channel; an anode frame 46 of metal; and an anode packing 47 of metal.

An interconnector 41, or a metal plate, is disposed between the fuel cells 2 for establishing electrical communication between the fuel cells 2 and shutting off the gas flow channel. The interconnector 41 is formed of, for example, a thin plate (e.g., 0.2 mm thick) of ferritic stainless steel.

Current collectors 48, 49 are disposed between the cathode 33 and the interconnector 41 located above the cathode 33 and between the anode 31 and the interconnector 41 located under the anode 31, respectively, for establishing electrical communication therebetween.

Thus, as shown in FIG. 4, the fuel cell apparatus 1 is configured such that a plurality of the fuel cells 2 each intervening between a pair consisting of the upper and lower interconnectors 41 of metal are disposed between a pair consisting of the upper and lower end holder members 4, 5. Since the interconnector 41 between the adjacent fuel cells 2 is used in common, a single interconnector 41 is disposed between the fuel cells 2 except for the upper and lower end fuel cells 2.

The solid electrolyte 32 has ion conductivity for allowing a portion of either one of fuel gas introduced into the anode 31 and oxidizer gas introduced into the cathode 33 to move therethrough in the form of ions in the course of operation of the fuel cell apparatus. Examples of such ions include oxygen ions and hydrogen ions. The anode 31 is in contact with fuel gas, which serves as reducer, and functions as a negative electrode in the cell. The cathode 33 is in contact with oxidizer gas, which serves as oxidizer, and functions as a positive electrode in the cell.

The solid electrolyte 32 can be formed of a known material, such as YSZ (yttria-stabilized zirconia), ScSZ (scandia-stabilized zirconia), SDC (samaria-doped ceria), GDC (gadolinium-doped ceria), or perovskite-type oxide. In the present embodiment, YSZ is used to form the solid electrolyte 32.

The anode 31 can be formed of any one of noble metals, base metals, such as Ni, and cermets of these metals and ceramic. In the present embodiment, Ni-YSZ is used to form the anode 31.

The cathode 33 can be formed of any one of perovskite-type oxide, noble metals, and cermets of noble metals and ceramic. In the present embodiment, $La(Sr)Fe(Co)O_3$ is used to form the cathode 33.

The interconnector 41 is formed of, for example, a thin plate (e.g., 0.2 mm thick) of ferritic stainless steel and has through holes 61 which are formed at four corners thereof and through which the bolts 11-14 are inserted. The interconnector 41 also has elongated through holes 62 formed in the vicinity of sides thereof. The elongated through holes 62 partially constitute the fuel gas supply path 15, the fuel gas exhaust path 16, the air supply path 17, and the air exhaust path 18, respectively.

In the thus-configured fuel cell stack 3, fuel gas which is supplied through the fuel gas supply path 15 of the upper end holder member 4 as shown in FIG. 4 is introduced into the fuel gas flow channels 101 in the fuel cells 2 through fuel-introduction-side cell communication portions 103 formed at side portions of the fuel cells 2 as shown in FIG. 2. Fuel gas in the fuel gas flow channels 101 in the fuel cells 2 is discharged from fuel-discharge-side cell communication portions 104 to the exterior of the fuel cell stack 3 via the fuel gas exhaust path 16 of the end holder member 4.

Air which is supplied through the air supply path 17 of the end holder member 4 as shown in FIG. 4 is introduced into the air flow channels 102 in the fuel cells 2 through air-introduction-side cell communication portions 105 formed at side portions of the fuel cells 2 as shown in FIG. 3. Air in the air flow channels 102 in the fuel cells 2 is discharged from air-discharge-side cell communication portions 106 to the exterior of the fuel cell stack 3 via the air exhaust path 18 of the end holder member 4.

As shown in FIG. 5, the end holder members 4, 5 are disposed at one end and at the other end, respectively, with respect to a stacking direction SY1 of the fuel cells 2. Each of the end holder members 4, 5 includes a plate-shaped solid electrolyte 71 (which corresponds to the second solid electrolyte of the present invention), a plate-shaped member 72 (hereinafter, referred to as the different-thermal-expansion member 72) having a thermal expansion coefficient different from that of the solid electrolyte 71, and an accommodation section 73 which accommodates the solid electrolyte 71 and the different-thermal-expansion member 72 therein.

In the present embodiment, the solid electrolyte 71 is formed of the same material as that used to form the solid electrolyte 32. Specifically, YSZ is used to form the solid electrolyte 71.

The different-thermal-expansion member 72 is disposed in such a manner that its one side is in contact with one side of the solid electrolyte 71.

In the present embodiment, the different-thermal-expansion member 72 is formed of the same material as that used to form the anode 31. Specifically, Ni-YSZ is used to form the different-thermal-expansion member 72. The thermal expansion coefficient of Ni-YSZ varies with Ni content. For example, when Ni content is 0 vol. % to 80 vol. %, the thermal expansion coefficient is $10 \times 10^{-6}/°$ C. to $14 \times 10^{-6}/°$ C. In the present embodiment, the thermal expansion coefficient of YSZ is $10 \times 10^{-6}/°$ C., and the thermal expansion coefficient of Ni-YSZ is $12 \times 10^{-6}/°$ C.

A laminate 70 (which corresponds to the electricity-non-generating laminate of the present invention) of the solid electrolyte 71 and the different-thermal-expansion member 72 is formed into the same shape as that of a laminate (hereinafter, may be referred to as the intra-cell laminate) of the solid electrolyte 32 and the anode 31.

As shown in FIGS. 5 and 6, the accommodation section 73 is configured by stacking together three frames 81, 82, 83 (a lower frame 81, a central frame 82, and an upper frame 83) of metal. In the present embodiment, the lower frame 81, the central frame 82, and the upper frame 83 have thicknesses of 4 mm, 1 mm, and 0.2 mm, respectively.

As shown in FIGS. 6A-6C, the lower frame 81 is a plate-shaped electrically conductive member; the laminate 70 of the solid electrolyte 71 and the different-thermal-expansion member 72 is disposed on a central portion of a surface 91 of the lower frame 81; and the lower frame 81 has a function of an end plate. The central frame 82 is a frame-shaped electrically conductive member disposed on the lower frame 81 and having an opening portion 92 capable of accommodating the laminate 70 therein. The upper frame 83 is a plate-shaped electrically conductive member disposed on the central frame 82 and having an area capable of covering the opening portion 92 of the central frame 82.

As shown in FIG. 5, the central frame 82 is formed such that its height H1 is substantially equal to a height H2 of the laminate 70. Accordingly, the laminate 70 accommodated in the accommodation section 73 is in contact with the upper frame 83.

The upper frame 83 is configured such that, when the laminate 70 deforms and presses the upper frame 83, the upper frame 83 deforms according to the pressing.

The end holder members 4, 5 are disposed such that the upper frames 83 are in contact with the fuel cell stack 3. In each of the end holder members 4, 5 of the present embodiment, the laminate 70 is disposed such that the solid electrolyte 71 is in contact with the upper frame 83. That is, when a direction from the different-thermal-expansion member 72 toward the solid electrolyte 71 along a stacking direction SY2 along which the solid electrolyte 71 and the different-thermal-expansion member 72 of the laminate 70 are stacked together is defined as a laminate stacking orientation SY3, the laminate stacking orientation SY3 of the end holder member 4 and the laminate stacking orientation SY3 of the end holder member 5 are opposite each other.

The metal frames 81, 82, 83 used to configure the accommodation section 73 collectively function as a current collector. That is, the metal frames 81, 82, 83 are formed of a material having electrical conductivity and heat resistance. In the present embodiment, the metal frames 81, 82, 83 are formed of the same material as that used to form the interconnector 41, and the metal frames 81, 83 can collectively serve as the interconnector 41.

Next, the method of fabricating the laminate 70 will be described.

First, a YSZ green sheet used to form the solid electrolyte 71 and an NiO-YSZ green sheet used to form the different-thermal-expansion member 72 are prepared.

The YSZ green sheet is prepared by the following procedure. First, butyral resin, DOP serving as a plasticizer, a dispersant, and a mixed solvent of toluene and ethanol are added to a YSZ powder. The resultant mixture is mixed in a ball mill, thereby yielding a slurry. Next, the prepared slurry is cast by a doctor blade process, thereby yielding a YSZ green sheet having a required thickness (10 μm in the present embodiment).

The NiO-YSZ green sheet is prepared by the following procedure. First, butyral resin, DOP serving as a plasticizer, a dispersant, and a mixed solvent of toluene and ethanol are added to a mixed powder prepared by mixing NiO powder and YSZ powder at a predetermined mixing ratio. The resultant mixture is mixed in a ball mill, thereby yielding a slurry. Next, the prepared slurry is cast by a doctor blade process, thereby yielding a YSZ green sheet having a required thickness (250 μm in the present embodiment).

A required number of the prepared YSZ green sheets and a required number of the prepared NiO-YSZ green sheets (one YSZ green sheet and five NiO-YSZ green sheets in the present embodiment) are stacked together, thereby yielding a green laminate.

Subsequently, the prepared green laminate is debindered at a predetermined temperature (250° C. in the present embodiment) and then fired at a predetermined temperature (1,350° C. in the present embodiment), thereby yielding a laminate of YSZ and NiO-YSZ.

Further, the laminate of YSZ and NiO-YSZ is subjected to a reduction process for reducing NiO-YSZ to Ni-YSZ, thereby yielding the laminate 70. Subsequently, the laminate 70 is sealed in each of the end holder members 4, 5 through vacuum joining.

The strength and the magnitude of warpage of the laminate 70 can be adjusted by changing the thickness of the laminate 70. Also, the magnitude of warpage of the laminate 70 can be adjusted by changing the Ni content of the different-thermal-expansion member 72.

Figure 7:
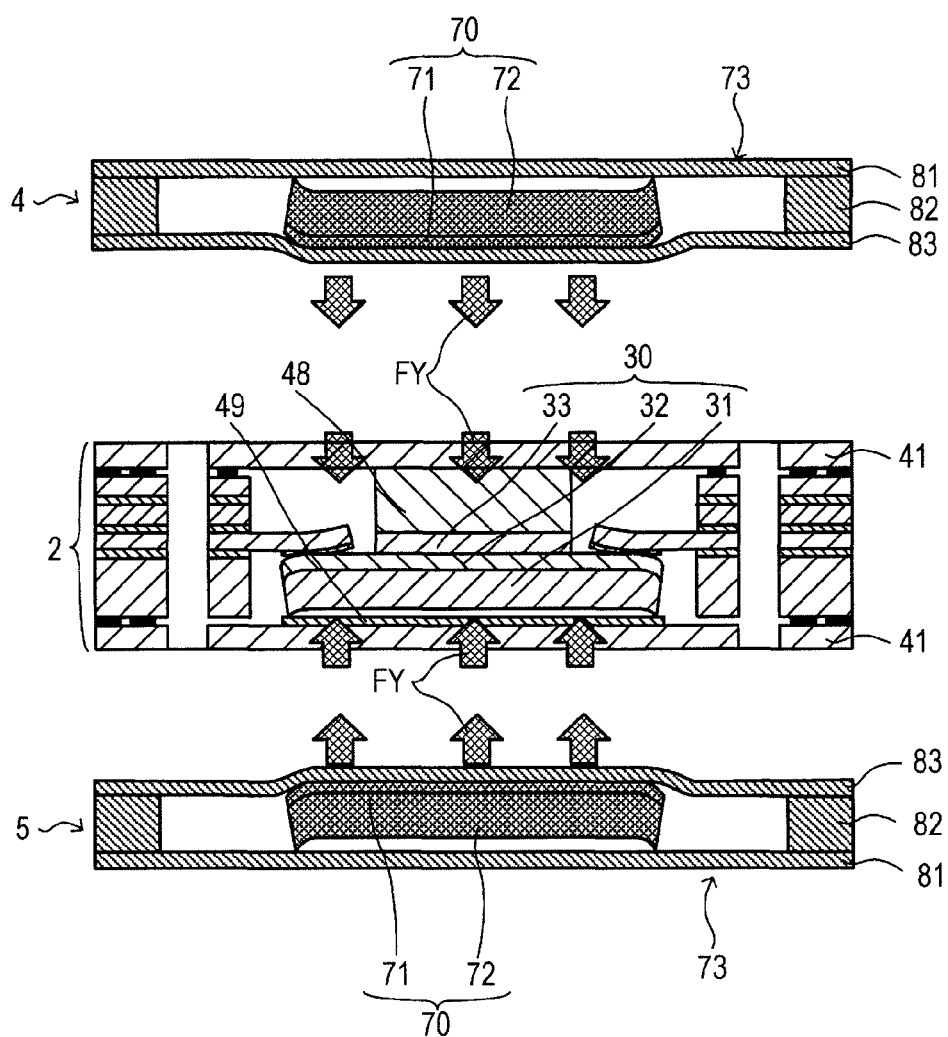
FIG. 7 Sectional view for explaining deformation of a fuel cell 2 and the end holder members 4, 5 of the first embodiment.

In the thus-configured fuel cell apparatus 1, as shown in FIG. 7, a repetition of a thermal cycle of the fuel cell apparatus 1 causes warpage of a laminate (intra-cell laminate) of the solid electrolyte 32 and the anode 31 in each of the fuel cells 2 and warpage of each of the laminates 70 (electricity-non-generating laminates). The intra-cell laminate warps for the following reason: since the solid electrolyte 32 and the anode 31 have different thermal expansion coefficients, stress is generated from differential thermal expansion between the solid electrolyte 32 and the anode 31 which are laminated together. Similarly, the laminate 70 warps for the following reason: since the solid electrolyte 71 and the different-thermal-expansion member 72 have different thermal expansion coefficients, stress is generated from differential thermal expansion between the solid electrolyte 71 and the different-thermal-expansion member 72 which are laminated together.

Warpage of the intra-cell laminate causes a reduction in a contact area between the anode 31 of the intra-cell laminate and the current collector 49 in contact with the anode 31, as well as a reduction in a contact area between the cathode 33 overlaid on the intra-cell laminate and the current collector 48 in contact with the cathode 33.

Meanwhile, as a result of warpage of the laminate 70, the laminate 70 presses the fuel cell 2 (see arrows FY in FIG. 7). This pressing can cause the intra-cell laminate or the current collector 49 in each of the fuel cells 2 to deform in such a manner as to increase a contact area between the anode 31 and the current collector 49 and can cause the cathode 33 or the current collector 48 to deform in such a manner as to increase a contact area between the cathode 33 and the current collector 48. Thus, there can be restrained the occurrence of defective electrical communication between the anode 31 and the current collector 49 and defective electrical communication between the cathode 33 and the current collector 48, which could otherwise result from warpage of the intra-cell laminate.

Further, similar to the case of the solid electrolyte 32 of the intra-cell laminate in the fuel cell 2, solid electrolyte is used to form the solid electrolyte 71 of the laminate 70. In comparison of a change in the degree of deformation caused by a repetition of a thermal cycle of the fuel cell apparatus 1 among the solid electrolyte 32 (intra-cell laminate 30), the solid electrolyte 71 (laminate 70), and a conventional flat spring, a change in the degree of deformation of the solid electrolyte 71 (laminate 70) is more similar to a change in the degree of deformation of the solid electrolyte 32 (intra-cell laminate 30) than to a change in the degree of deformation of the flat spring. This is because materials of the same kind; i.e., solid electrolyte, are used to form the solid electrolyte 32 (intra-cell laminate 30) and the solid electrolyte 71 (laminate 70), whereas the flat spring is formed of a material different from that used to form the solid electrolyte 32 (intra-cell laminate 30) and the solid electrolyte 71 (laminate 70).

Thus, when a thermal cycle of the fuel cell apparatus is repeated, the laminate 70 can press the fuel cells 2 while deforming according to a deformation of the intra-cell laminates more reliably than can the flat spring. That is, the laminate 70 can deform the intra-cell laminates or the current collectors 49 so as to increase a contact area between the anode 31 and the current collector 49 and can deform the cathode 33 or the current collectors 48 so as to increase a contact area between the cathode 33 and the current collector 48 more reliably than can the flat spring. Thus, as compared with the case where the flat spring is used to press the fuel cells 2, there can be more reliably restrained the occurrence of defective electrical communication between the anode 31 and the current collector 49 and defective electrical communication between the cathode 33 and the current collector 48, which could otherwise result from a repetition of a thermal cycle of the fuel cell apparatus 1, whereby the reliability of electrical contact in the fuel cell apparatus 1 can be improved.

Further, in the fuel cell apparatus 1, as mentioned above, the laminates 70 are deformed according to a deformation of the intra-cell laminates, thereby pressing the fuel cells 2. That is, by use of only the laminates 70, the fuel cell apparatus 1 can implement a function which the fuel cell apparatus of aforementioned Patent Document 1 implements by use of the end plates and the flat springs. Thus, as compared with the fuel cell apparatus of Patent Document 1, the fuel cell apparatus 1 can simplify a configuration for restraining the occurrence of the above-mentioned defective electrical communication.

The solid electrolyte 71 is formed of the same material as that used to form the solid electrolyte 32, and the different-thermal-expansion member 72 is formed of the same material as that used to form the anode 31. Thus, the laminate 70 can press the fuel cells 2 while deforming according to a deformation of the intra-cell laminates more reliably than in the case where the laminate 70 is formed of materials different from those used to form the intra-cell laminate. Thus, there can be more reliably restrained the occurrence of defective electrical communication between the anode 31 and the current collector 49 and defective electrical communication between the cathode 33 and the current collector 48, which could otherwise result from a repetition of a thermal cycle of the fuel cell apparatus 1.

The laminate 70 has the same shape as that of the intra-cell laminate. Thus, when a thermal cycle of the fuel cell apparatus 1 is repeated, the laminate 70 can press the fuel cells 2 while deforming according to a deformation of the intra-cell laminates more reliably than in the case where the laminate 70 has a shape different from that of the intra-cell laminate. Hence, there can be more reliably restrained the occurrence of defective electrical communication between the anode 31 and the current collector 49 and defective electrical communication between the cathode 33 and the current collector 48, which could otherwise result from a repetition of a thermal cycle of the fuel cell apparatus 1.

The different-thermal-expansion member 72 is formed such that a plurality of NiO-YSZ green sheets are laminated together. Thus, the thickness of the different-thermal-expansion member 72 can be changed with the number of NiO-YSZ green sheets. The strength and the magnitude of warpage of the laminate 70 can be changed with the thickness of the different-thermal-expansion member 72. That is, by an easy method of changing the number of NiO-YSZ green sheets, the strength and the magnitude of warpage of the laminate 70 can be adjusted.

In the above-described embodiment, the solid electrolyte 32 corresponds to the first solid electrolyte in the present invention; the solid electrolyte 71 corresponds to the second solid electrolyte in the present invention; the laminate 70 corresponds to the electricity-nongenerating laminate in the present invention; the upper frame 83 corresponds to the electrically conductive member in the present invention; the stacking direction SY0 corresponds to the first stacking direction in the present invention; the stacking direction SY1 corresponds to the second stacking direction in the present invention; the stacking direction SY2 corresponds to the third stacking direction in the present invention; and the NiO-YSZ green sheet corresponds to the thin film in the present invention.

Second Embodiment

Figure 8:
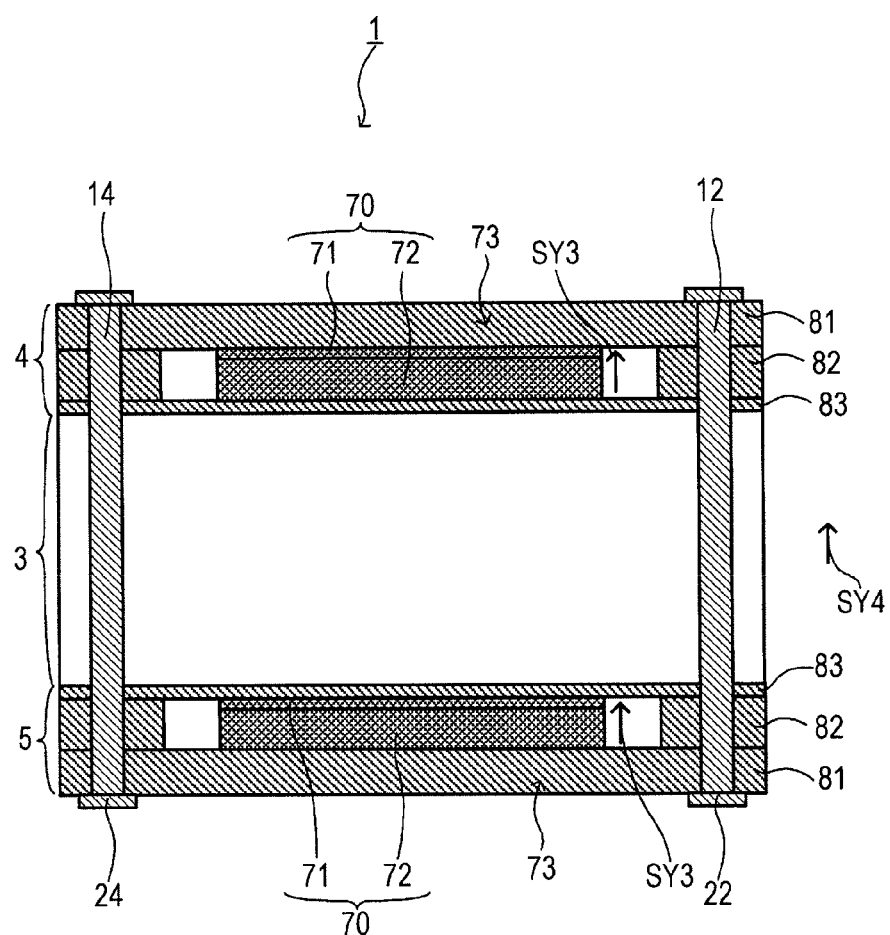
FIG. 8 Sectional view of a fuel cell apparatus 1 of a second embodiment.

A second embodiment of the present invention will next be described with reference to the drawings. The description of the second embodiment covers only those features different from those of the first embodiment. FIG. 8 is a schematic sectional view of the fuel cell apparatus 1 of the second embodiment.

As shown in FIG. 8, the solid oxide fuel cell apparatus 1 of the second embodiment is similar to that of the first embodiment, except that the laminate 70 of the end holder member 4 is disposed such that the different-thermal-expansion member 72 is in contact with the upper frame 83. That is, the end holder member 4 and the end holder member 5 have the same laminate stacking orientation SY3.

In the thus-configured fuel cell apparatus 1, the laminate stacking orientation SY3 of the end holder members 4, 5 and a direction SY4 from the anode 31 toward the solid electrolyte 32 in the cell 30 (hereinafter, referred to as the cell stacking orientation SY4) can be the same.

Rendering the laminate stacking orientation SY3 of the end holder members 4, 5 and the cell stacking orientation SY4 of the fuel cells 2 identical with each other is advantageous in view of the following phenomenon. In the fuel cell stack 3 in which a plurality of the fuel cells 2 are stacked, the fuel cells 2 located at a central portion of the fuel cell stack 3 are less susceptible to defective electrical communication between the anode 31 and the current collector 49 than are the fuel cells 2 located at opposite end portions of the fuel cell stack 3 with respect to the cell stacking direction along which the fuel cells 2 are stacked together.

The fuel cells 2 of the above-mentioned central portion differ from the fuel cells 2 of the above-mentioned opposite end portions in that the fuel cell having the same cell stacking orientation is disposed on each of opposite sides of each of the fuel cells 2 of the central portion, whereas the fuel cell having the same cell stacking orientation SY4 is disposed on only a single side of each of the fuel cells of the opposite end portions. Thus, by means of disposing the laminate 70 having the laminate stacking orientation SY3, which is the same as the cell stacking orientation SY4, on a side of each of the fuel cells 2 of the opposite end portions opposite a side on which the fuel cell 2 is disposed, the fuel cells 2 of the opposite end portions can be brought into a state similar to that of the fuel cells 2 of the central portion. Thus, conceivably, in the fuel cells 2 of the opposite end portions, there can be restrained the occurrence of defective electrical communication between the anode 31 and the current collector 49 and defective electrical communication between the cathode 33 and the current collector 48.

Meanwhile, the laminate 70 may have the same configuration as that of the fuel cells 2 of the fuel cell stack 3; i.e., the laminate 70 may have the anode 31, the solid electrolyte 32, and the cathode 33; however, the laminate 70 is not allowed to contribute to an electricity-generating reaction, and functions as the end holder member 4, 5 (cell-follow-up deformation member). The laminate 70 may be disposed at each of opposite end portions or a central portion of the fuel cell stack 3.

Third Embodiment

Figure 9:
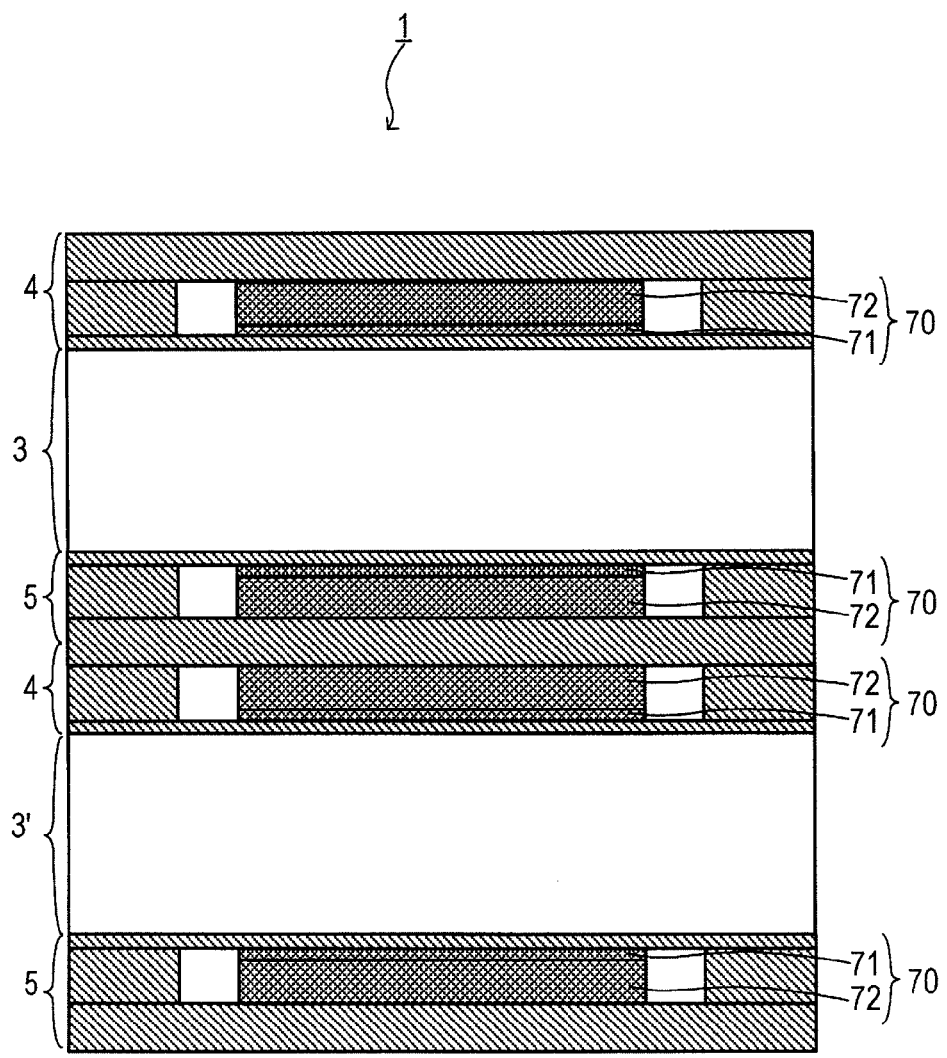
FIG. 9 Sectional view of a fuel cell apparatus 1 of a third embodiment.

A third embodiment of the present invention will next be described with reference to the drawings. The description of the third embodiment covers only those features different from those of the first embodiment. FIG. 9 is a schematic sectional view of the fuel cell apparatus 1 of the third embodiment.

As shown in FIG. 9, the solid oxide fuel cell apparatus 1 of the third embodiment is similar to that of the first embodiment, except that the fuel cell apparatus 1 includes a plurality of fuel cell stacks 3, 3', and the end holder member 4 or the end holder member 5 is also disposed between the fuel cell stack 3 and the fuel cell stack 3'.

According to the present embodiment, the end holder member is disposed between the fuel cell stack and the fuel cell stack. However, the end holder member may be disposed between the fuel cell and the fuel cell within the fuel cell stack. In this case, each of the upper and lower frames used to hold the laminate 70 therebetween is formed of a thin plate of metal capable of deforming according to warpage of the fuel cell.

Fourth Embodiment

Figure 10:
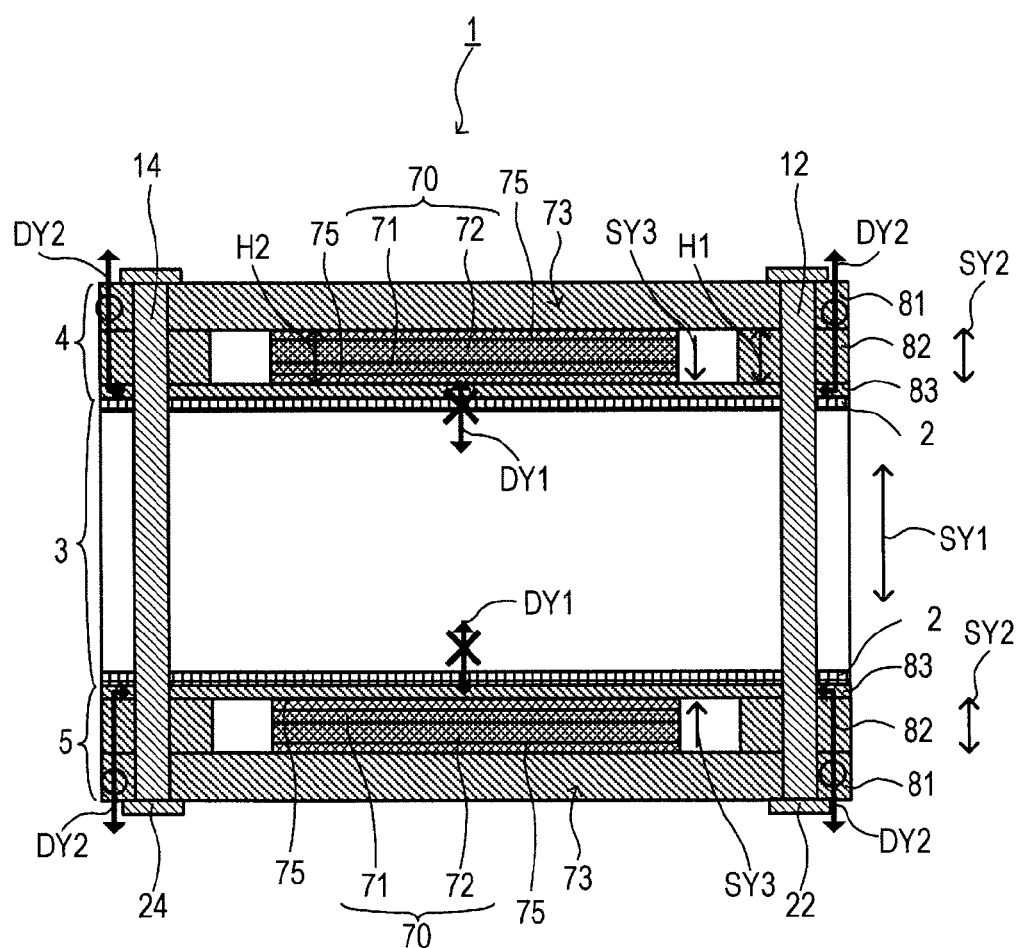
FIG. 10 Schematic sectional view of a fuel cell apparatus 1 of a fourth embodiment.

A fourth embodiment of the present invention will next be described with reference to the drawings. The description of the fourth embodiment covers only those features different from those of the first embodiment. FIG. 10 is a schematic sectional view of the fuel cell apparatus 1 of the fourth embodiment.

As shown in FIG. 10, the solid oxide fuel cell apparatus 1 of the fourth embodiment is similar to that of the first embodiment, except that an electrically insulative layer 75 (material: for example, alumina; thickness: for example, 20 µm) is disposed between the laminate 70 and the frame 83 of metal and between the laminate 70 and the frame 81 of metal, and the solid electrolyte 71 of the laminate 70 is formed of a material having ion conductivity and electron conductivity (material: for example, GDC (gadolinium-doped ceria)).

In the thus-configured fuel cell apparatus 1, the provision of the electrically insulative layer 75 between the laminate 70 and the frame 81 of metal lowers the electron conductivity of the laminates 70 disposed on opposite sides of the fuel cell stack 3 (see arrows DY1 in FIG. 10). Also, since the laminates 70 are disposed in a central region, a current path detours in such a manner as to run along a periphery of the fuel cell stack 3, whereby an appropriate electrical resistance can be imparted to the current path (see arrows DY2 in FIG. 10). Therefore, the fuel cells 2 adjacent to the laminates 70 can generate more Joule heat through flow of current, so that the generation of heat can be increased as compared with the fuel cell stack 3 not having the laminates 70 at the opposite end portions, thereby contributing to establishment of temperature uniformity between the end portions and the interior of the fuel cell stack 3.

The electrically insulative layer 75 in the above-described embodiment corresponds to the electrically insulative member in the present invention.

Fifth Embodiment

Figure 11:
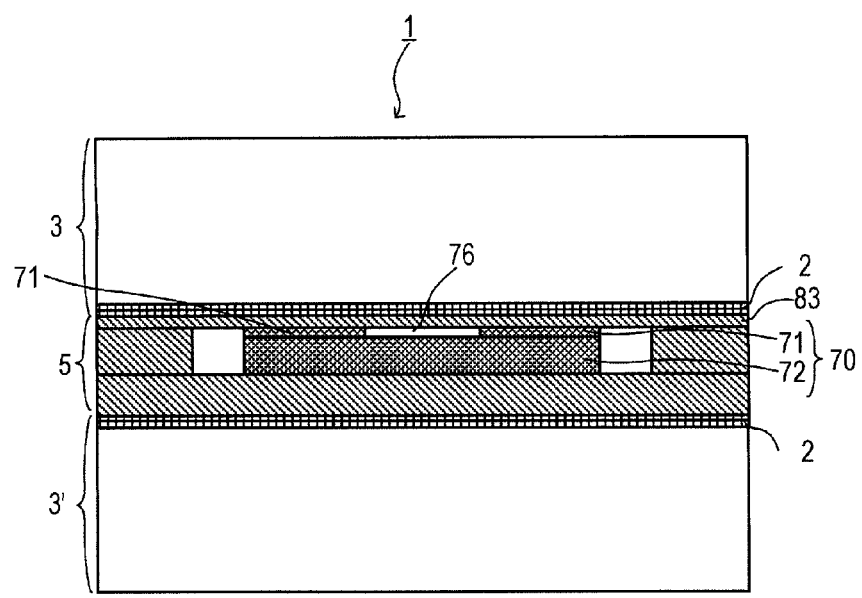
FIG. 11 Sectional view of an end holder member 5 of a fifth embodiment.
Figure 12:
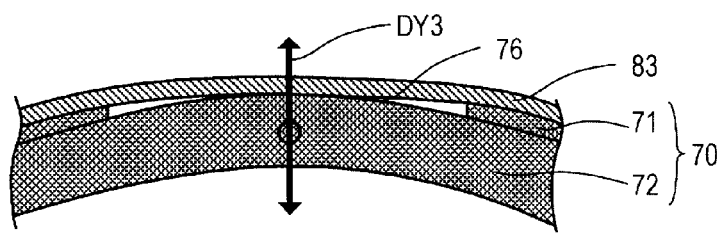
FIG. 12 View for explaining contact between a different-thermal-expansion member 72 and a frame 83 of metal of the fifth embodiment.

A fifth embodiment of the present invention will next be described with reference to the drawings. The description of the fifth embodiment covers only those features different from those of the third embodiment. FIG. 11 is a schematic sectional view of the fuel cell apparatus 1 of the fifth embodiment. FIG. 12 is a view for explaining contact between the different-thermal-expansion member 72 and the frame 83 of metal in the fifth embodiment.

As shown in FIG. 11, the solid oxide fuel cell apparatus 1 of the fifth embodiment is similar to that of the third embodiment, except that only the end holder member 5 is disposed between the fuel cell stack 3 and the fuel cell stack 3', and a region where the solid electrolyte 71 is disposed and a hollow region 76 where the solid electrolyte 71 is not disposed are formed between the different-thermal-expansion member 72 and the frame 83 of metal.

In the thus-configured fuel cell apparatus 1, when, as a result of deformation of the laminate 70, the different-thermal-expansion member 72 and the frame 83 of metal come into contact with each other in the hollow region 76 as shown in FIG. 12, current flows through the laminate 70 (see arrow DY3 in FIG. 12). Shortening a current path in this manner restrains the generation of Joule heat in the interior (particularly, a central portion) of the fuel cell stack 3, whereby temperature uniformity of the entire fuel cell stack 3 can be improved. This feature is particularly effective when an electrically insulative material having ion conductivity, such as YSZ (yttria-stabilized zirconia), is used to form the solid electrolyte 71.

The hollow region 76 in the above-described embodiment corresponds to the region where the second solid electrolyte is not formed, in the present invention.

Sixth Embodiment

A sixth embodiment of the present invention will next be described with reference to the drawings. The description of the sixth embodiment covers only those features different from those of the first embodiment.

Figure 13:
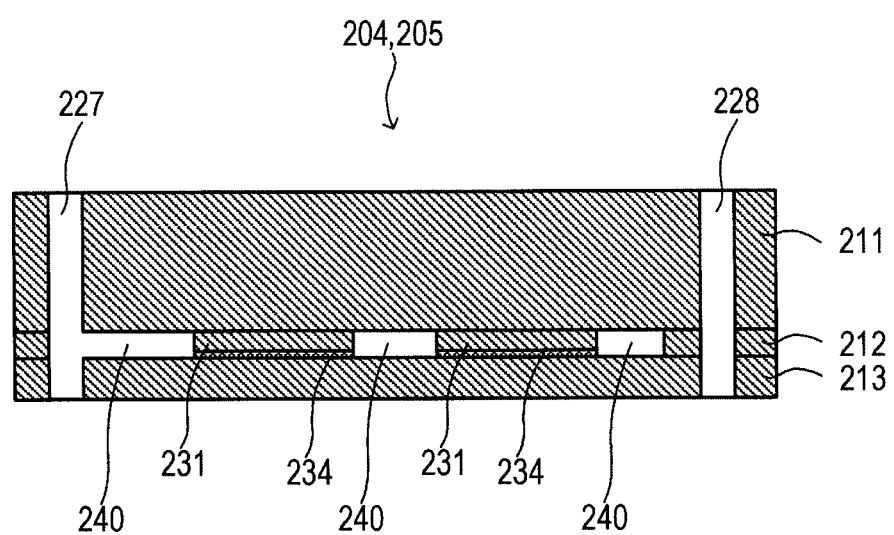
FIG. 13 Sectional view of a gas spring 204, 205 of a sixth embodiment.
Figure 15:
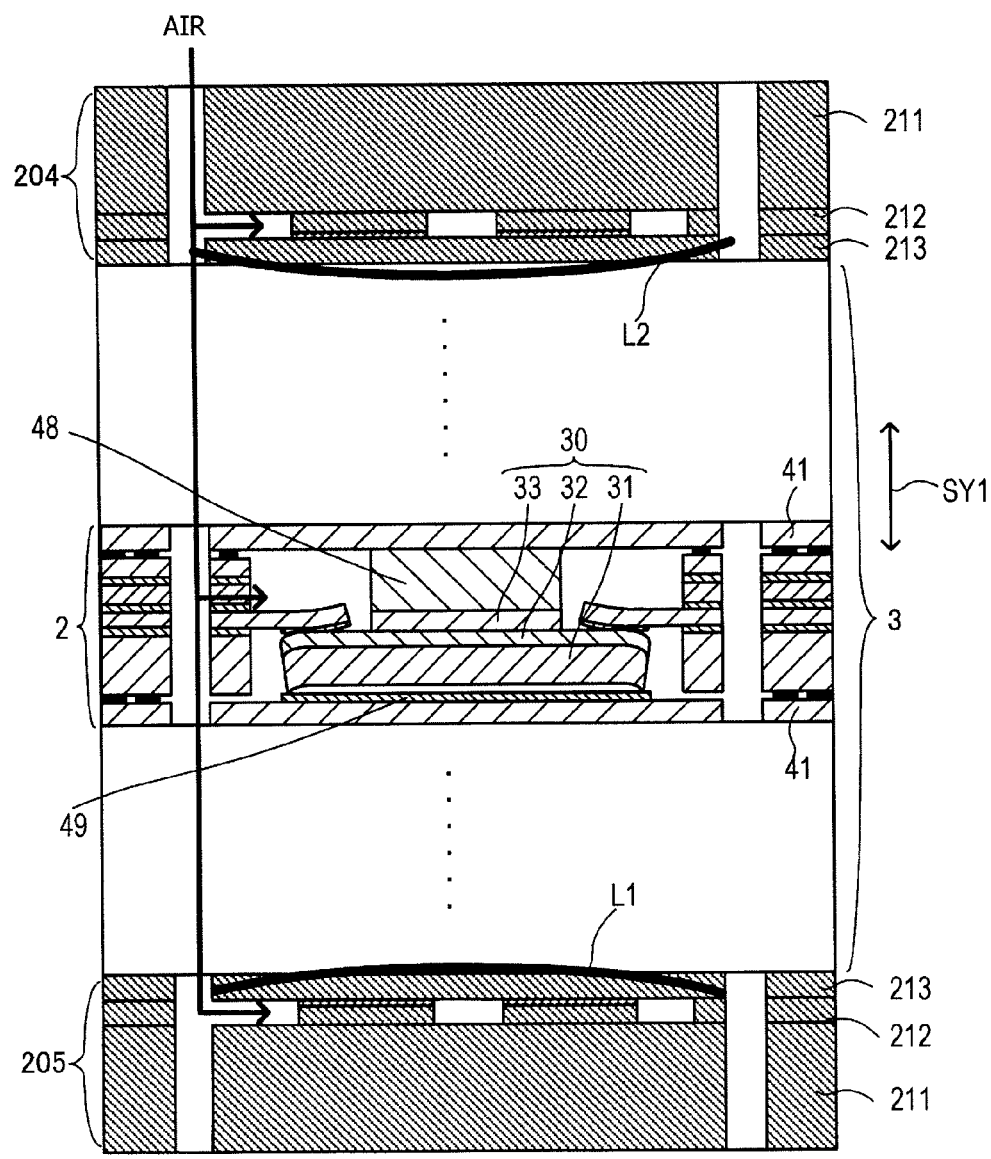
FIG. 15 Schematic sectional view showing the arrangement of the fuel cells 2 and the gas springs 204, 205 of the sixth embodiment.

FIG. 13 is a sectional view of a gas spring 204, 205; FIGS. 14A-14B are exploded plan views of the gas spring 204, 205; and FIG. 15 is a schematic sectional view showing the arrangement of the fuel cells 2 and the gas springs 204, 205.

The solid oxide fuel cell apparatus 1 of the sixth embodiment is similar to that of the first embodiment, except that the gas springs 204, 205 are provided in place of the end holder members 4, 5. Similar to the case of the first embodiment, according to the present embodiment, the gas spring is disposed on each of opposite sides of the fuel cell stack. However, even when the gas spring is disposed on either one of opposite sides of the fuel cell stack, the present invention is effectively applicable. In this case, at an end portion of the fuel cell stack where the gas spring is not disposed, a metal plate having a function of an end plate and having gas supply and discharge paths and bolt fixation holes is disposed.

As shown in FIG. 13, the gas springs 204, 205 disposed on opposite sides of the fuel cell stack are configured such that three frames 211, 212, 213 (an upper frame 211, a central frame 212, and a lower frame 213) of metal are stacked together. The frames 211, 212, 213 of metal are vacuum-brazed at 1,000° C. by use of a brazing material (Aged).

In the present embodiment, the upper frame 211, the central frame 212, and the lower frame 213 have thicknesses of 5 mm, 0.5 mm, and 0.5 mm, respectively. The upper frame 211 is sufficiently thick as compared with the lower frame 213 and has a function of serving as an end plate.

Thus, the lower frame 213 is configured to be deformed by the difference in pressure between its front side and its back side, whereas the upper frame 211 is configured so as not to be deformed by the difference in pressure between its front side and its back side.

Further, the lower frame 213 is configured such that, when the fuel cell 2 in contact with the lower frame 213 presses the lower frame 213 through deformation of the fuel cell 2, the lower frame 213 is deformed accordingly.

As shown in FIGS. 14A-14B, the upper frame 211 and the lower frame 213 are plate-shaped members having bolt fixation holes 221-224 formed at four corners as well as a fuel gas supply hole 225, a fuel gas exhaust hole 226, an air supply hole 227, and an air exhaust hole 228 formed therein.

The central frame 212 has a function of serving as a spacer member for preventing contact between the upper frame 211 and the lower frame 213 and is a frame-shaped member having an opening portion 232 capable of accommodating therein four columnar members 231 each having a rectangular section. Thus, as a result of being held between the upper frame 211 and the lower frame 213, the opening portion 232 of the central frame 212 forms a hollow portion 240 (the hollow portion 240 may be called the gas chamber 240). Further, the central frame 212 and the columnar members 231 are joined together via joint portions 233.

Similar to the case of the upper frame 211 and the lower frame 213, the central frame 212 has the bolt fixation holes 221-224 formed at four corners as well as the fuel gas supply hole 225, the fuel gas exhaust hole 226, the air supply hole 227, and the air exhaust hole 228 formed therein. The air supply hole 227 communicates with the opening portion 232. Thus, air can be introduced into the gas chamber 240 via the air supply hole 227. Meanwhile, the air exhaust hole 228 does not communicate with the opening portion 232 (gas chamber 240).

Each of the columnar members 231 has an alumina layer 234 disposed on its side facing the lower frame 213. The alumina layer 234 is formed by applying alumina paste to a thickness of, for example, 20 μm, followed by heat treatment. The alumina layer 234 prevents the occurrence of seizure between the columnar members 231 and the lower frame 213.

The frames 211, 212, 213 collectively function as a current collector. That is, the frames 211, 212, 213 are formed of a material having electrical conductivity and heat resistance. In the present embodiment, the frames 211, 212, 213 are formed of the same material as that used to form the interconnector 41.

As shown in FIG. 15, the gas springs 204, 205 are disposed at one end and the other end, respectively, of the fuel cell stack 3 with respect to the stacking direction SY1 of the fuel cells 2 such that the lower frames 213 are in contact with the fuel cell stack 3. The lower frames 213 of the gas springs 204, 205 also serve as interconnectors 41 adjacent to the gas springs 204, 205.

In the thus-configured fuel cell apparatus 1, each of the gas springs 204, 205 has the gas chamber 240 formed between the upper frame 211 and the lower frame 213 in such a manner as to allow introduction of air thereinto.

The gas spring 205 is in contact with a side toward the anode 31 of the adjacent fuel cell 2. That is, fuel gas is introduced on a side toward the fuel cell 2 with respect to the lower frame 213, and air is introduced into the gas chamber 240 located on a side toward the gas chamber 205 with respect to the lower frame 213.

Since the pressure of air introduced into the gas chamber 240 of the gas spring 205 is higher than the pressure of fuel gas introduced into the fuel cell 2 adjacent to the gas spring 205, the lower frame 213 disposed between the fuel cell 2 and the gas chamber 240 is deformed in such a manner as to fill a gap between the fuel cell 2 and the lower frame 213; i.e., according to deformation of the fuel cell 2, whereby the lower frame 213 can press the fuel cell 2 (see a curve L1 in FIG. 15). That is, the gas spring 205 can deform the intra-cell laminate or the current collectors 48, 49 in such a manner as to increase a contact area between the anode 31 and the current collector 49 as well as a contact area between the cathode 33 and the current collector 48, more reliably than does the flat spring. Thus, as compared with the case where the flat spring is used to press the fuel cell 2, there can be more reliably restrained the occurrence of defective electrical communication between the anode 31 and the current collector 49 and defective electrical communication between the cathode 33 and the current collector 48, which could otherwise result from a repetition of a thermal cycle of the fuel cell apparatus 1, whereby the reliability of electrical contact in the fuel cell apparatus 1 can be improved.

The gas spring 204 is in contact with a side toward the cathode 33 of the adjacent fuel cell 2. That is, air is introduced on a side toward the fuel cell 2 with respect to the lower frame 213 from the air supply path 17 via the air flow channel 102 (see FIG. 3), and air is introduced into the gas chamber 240 located on a side toward the gas spring 204 with respect to the lower frame 213 via the air supply hole 227 (see FIG. 13) which communicates directly with the air supply path 17. Thus, the degree of pressure drop on the fuel cell 2 side caused by pressure loss associated with passage of air through the air flow channel 102 is greater than the degree of pressure drop caused by passage of air in the gas chamber 240 of the gas spring 204 which is located on a side opposite the fuel cell 2 with respect to the lower frame 213. As a result, pressure in the gas chamber 240 is higher than pressure in the fuel cell 2. Accordingly, the gas spring 204 presses the fuel cell 2. This pressing can cause the intra-cell laminate or the current collector 49 in the fuel cell 2 to deform in such a manner as to increase a contact area between the anode 31 and the current collector 49 and can cause the cathode 33 or the current collector 48 to deform in such a manner as to increase a contact area between the cathode 33 and the current collector 48. Thus, there can be restrained the occurrence of defective electrical communication between the anode 31 and the current collector 49 and defective electrical communication between the cathode 33 and the current collector 48, which could otherwise result from warpage of the intra-cell laminate (see a curve L2 in FIG. 15).

The provision of the columnar members 231 avoids contact between the upper frame 211 and the lower frame 213. This solves a problem in that the upper frame 211 and the lower frame 213 come into contact with each other and seize in relation to each other at a high temperature. This is particularly effective for a fuel cell apparatus used in a high-temperature environment, such as a solid oxide fuel cell apparatus. Thus, there can be restrained the occurrence of a situation in which the upper frame 211 and the lower frame 213 in contact with each other seize in relation to each other with a resultant crushing of a cavity of the gas chamber 240, thereby restraining the associated occurrence of an impairment in follow-up deformability of the gas springs 204, 205.

Since the columnar members 231 are formed of a metal material, the alumina layer 234 is disposed between the columnar members 231 and the lower frame 213. Thus, there can be restrained the occurrence of a situation in which the columnar members 231 and the lower frame 213 in contact with each other seize in relation to each other with a resultant lower frame 213's failure to deform according to deformation of the fuel cell 2.

In the gas springs disposed on opposite sides of the fuel cell stack, air can be introduced into the gas chamber 240 via the air supply hole 227 which communicates directly with the air supply path 17 of the fuel cell stack 3, whereas the air exhaust hole 228 which communicates directly with the air exhaust hole 18 of the fuel cell stack 3 does not communicate with the opening portion 232 (gas chamber 240) of the gas spring. Thus, air stagnates within the gas chamber 240, whereby thermal insulation effect can be exhibited within the gas chamber 240. As a result, this can avoid a tendency for opposite end portions of the fuel cell stack 3 to become lower in temperature than the interior (particularly, a central portion) of the fuel cell stack 3, thereby contributing to an increase in the temperature of opposite end portions of the fuel cell stack 3. Thus, the temperature uniformity of the entire fuel cell stack 3 can be established.

Also, gas (air or fuel gas) to be used for electricity-generating reaction in the fuel cell stack 3 can be used as auxiliary gas to be supplied into the gas chamber 240, thereby eliminating need to prepare gas of a separate system for use as auxiliary gas to be supplied into the gas chamber 240.

In the above-described embodiment, the gas spring 204, 205 corresponds to the cell-follow-up deformation member in the present invention; the upper frame 211 corresponds to the first metal plate in the present invention; the lower frame 213 corresponds to the second metal plate in the present invention; the columnar members 231 collectively correspond to the spacer member in the present invention; and air corresponds to auxiliary gas in the present invention.

Figure 21:
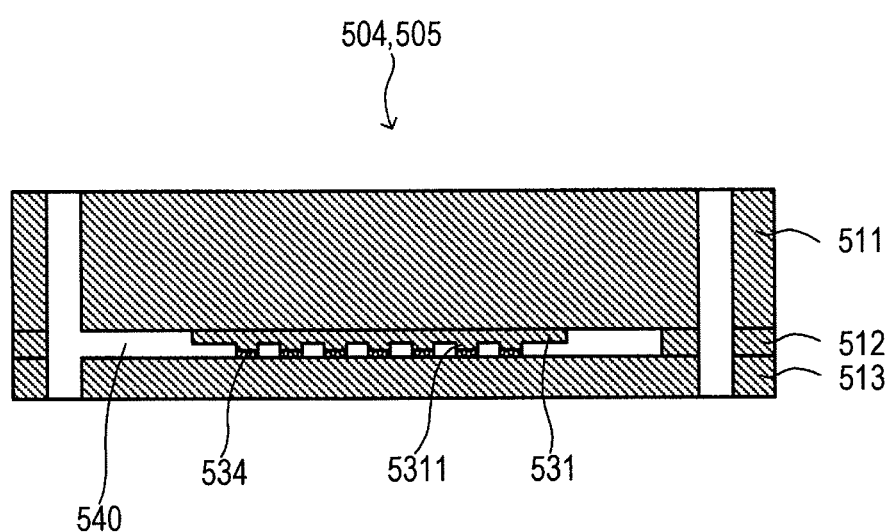
FIG. 21 Sectional view of a modification of the gas spring 504, 505 of the sixth embodiment.
Figure 22A:
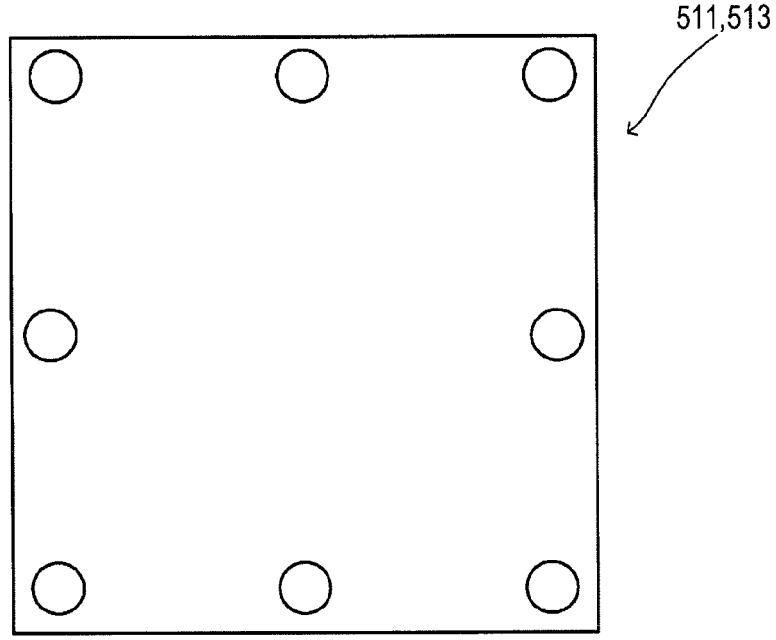
FIGS. 22A-22B Exploded plan views of the modification of the gas spring 504, 505 of the sixth embodiment.
Figure 22B:
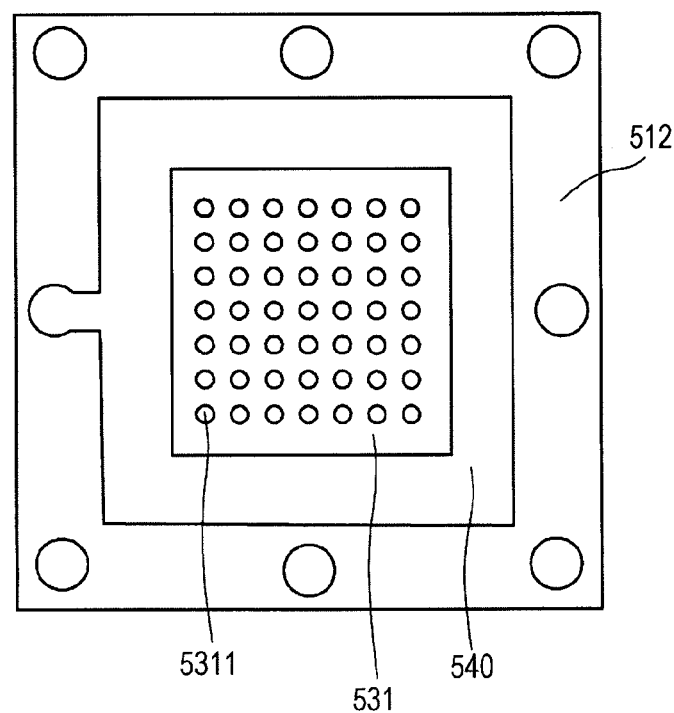

FIG. 21 and FIGS. 22A-22B show gas springs 504, 505 according to a modification of the present embodiment. The description of the modification covers only those features different from those of the sixth embodiment. The present modified embodiment is similar to the sixth embodiment, except that a central frame 512 different in configuration from the central frame 212 (FIG. 13) is disposed.

As shown in FIG. 21 and FIGS. 22A-22B, in the central frame 512 having a function of serving as a spacer member for preventing contact between an upper frame 511 and a lower frame 513, a columnar member 531 and a frame-shaped member (central frame 512) are formed as separate members. One side of the columnar member 531 and one side of the frame-shaped member 512 are joined to the upper frame 511. An alumina layer 534 is disposed on protrusions 5311 formed on the other side of the columnar member 531. The alumina layer 534 prevents the occurrence of seizure between the columnar member 531 and the lower frame 513. The gas spring 504, 505 may be disposed on at least one of opposite sides of the fuel cell stack. No particular limitation is imposed on the shape of the protrusions 5311 formed on the columnar member 531 shown in FIG. 21 and FIGS. 22A-22B, so long as the protrusions 5311 can avoid the occurrence of crushing of a cavity of a gas chamber 540.

Seventh Embodiment

A seventh embodiment of the present invention will next be described with reference to the drawings. The description of the seventh embodiment covers only those features different from those of the sixth embodiment.

Figure 16:
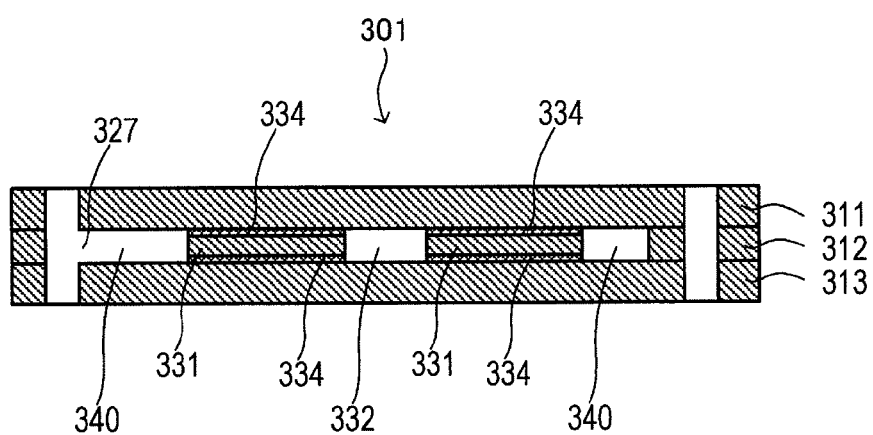
FIG. 16 Sectional view of a gas spring 301 of a seventh embodiment.
Figure 17:
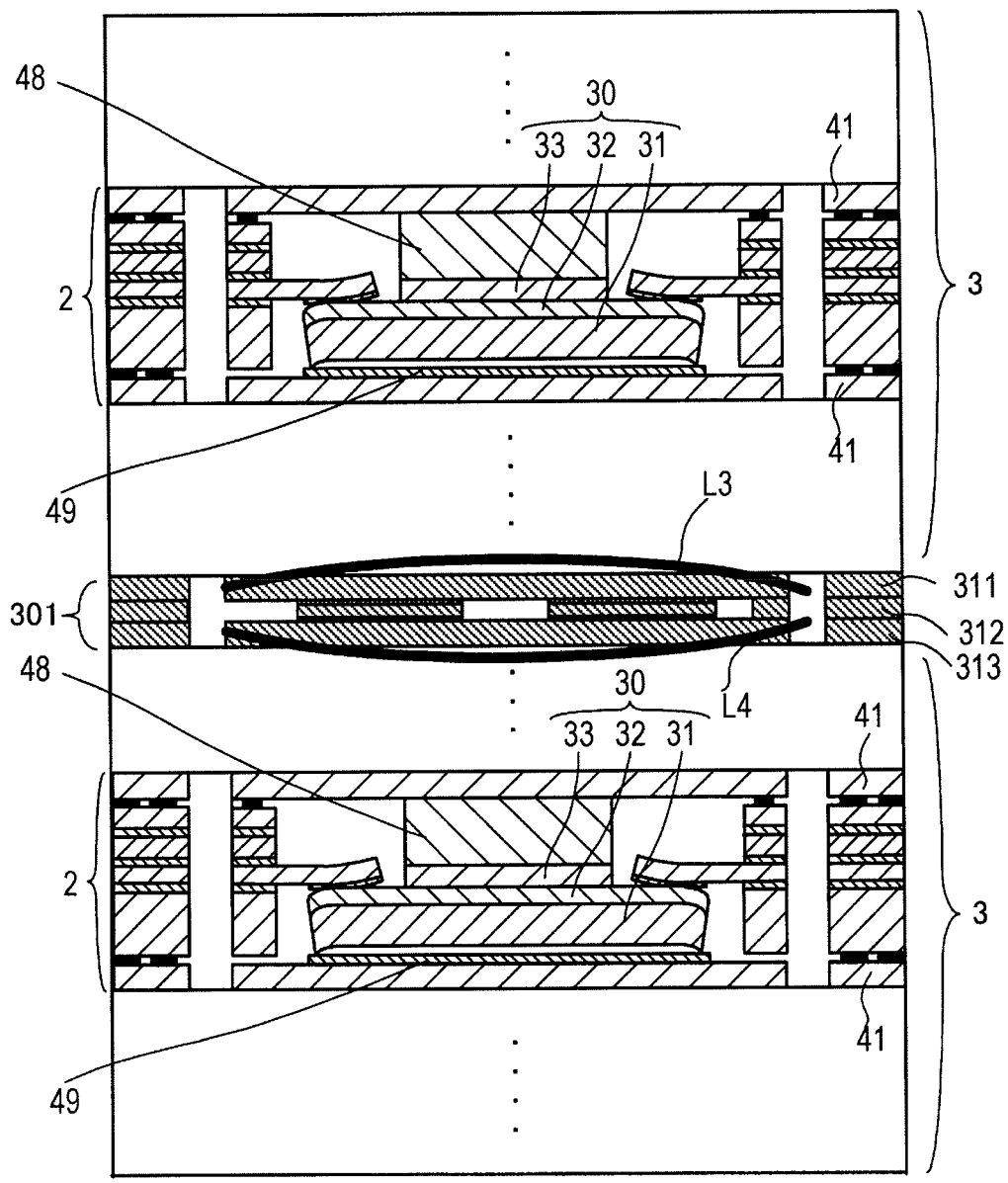
FIG. 17 Schematic sectional view showing the arrangement of the fuel cells 2 and the gas spring 301 of the seventh embodiment.

FIG. 16 is a sectional view of a gas spring 301. FIG. 17 is a schematic sectional view showing the arrangement of the fuel cells 2 and the gas spring 301.

The solid oxide fuel cell apparatus 1 of the seventh embodiment is similar to that of the sixth embodiment, except that the gas spring 301 is provided in place of the gas springs 204, 205.

As shown in FIG. 16, the gas spring 301 disposed in the interior of the fuel cell stack is configured such that three frames 311, 312, 313 (an upper frame 311, a central frame 312, and a lower frame 313) of metal are stacked together.

In the present embodiment, the upper frame 311, the central frame 312, and the lower frame 313 have a thickness of 0.5 mm.

Thus, the upper frame 311 and the lower frame 313 are configured to be deformed by the difference in pressure between their front side and their back side.

Further, the upper frame 311 and the lower frame 313 are configured such that, when the fuel cell 2 in contact with the upper frame 311 and the fuel cell 2 in contact with the lower frame 313 press the upper frame 311 and the lower frame 313, respectively, through deformation of the fuel cells 2, the upper frame 311 and the lower frame 313 are deformed accordingly.

The central frame 312 is a frame-shaped member having an opening portion 332 capable of accommodating therein four columnar members 331 each having a rectangular section. Thus, as a result of being held between the upper frame 311 and the lower frame 313, the opening portion 332 of the central frame 312 forms a hollow portion 340 (hereinafter, the hollow portion 340 may be called the gas chamber 340).

Each of the columnar members 331 has an alumina layer 334 disposed on its side facing the upper frame 311 and on its side facing the lower frame 313. The alumina layer 334 is formed by applying alumina paste to a thickness of, for example, 20 µm.

As shown in FIG. 17, the gas spring 301 is disposed between the fuel cell stacks 3. The upper frame 311 and the lower frame 313 also serve as the interconnectors 41 adjacent to the gas spring 301.

In the thus-configured fuel cell apparatus 1, the gas spring 301 has the gas chamber 340 formed between the upper frame 311 and the lower frame 313 in such a manner as to allow introduction of air thereinto.

The gas spring 301 is in contact with a side toward the anode 31 of the adjacent fuel cell 2. That is, fuel gas is introduced on a side toward the fuel cell 2 with respect to the upper frame 311, and air is introduced into the gas chamber 340 located on a side toward the gas spring 301 with respect to the upper frame 311.

Since the pressure of air introduced into the gas chamber 340 of the gas spring 301 is higher than the pressure of fuel gas introduced into the fuel cell 2 adjacent to the gas spring 301, the upper frame 311 disposed between the fuel cell 2 and the gas chamber 340 is deformed in such a manner as to fill a gap between the fuel cell 2 and the upper frame 311; i.e., according to deformation of the fuel cell 2, whereby the upper frame 311 can press the fuel cell 2 (see a curve L3 in FIG. 17). That is, the gas spring 301 can deform the intra-cell laminate or the current collectors 48, 49 in such a manner as to increase a contact area between the anode 31 and the current collector 49 as well as a contact area between the cathode 33 and the current collector 48, more reliably than does the flat spring. Thus, as compared with the case where the flat spring is used to press the fuel cell 2, there can be more reliably restrained the occurrence of defective electrical communication between the anode 31 and the current collector 49 and defective electrical communication between the cathode 33 and the current collector 48, which could otherwise result from a repetition of a thermal cycle of the fuel cell apparatus 1, whereby the reliability of electrical contact in the fuel cell apparatus 1 can be improved.

As shown in FIG. 17, the gas spring 301 is also in contact with a side toward the cathode 33 of the adjacent fuel cell 2. That is, air is introduced on a side toward the fuel cell 2 with respect to the lower frame 313 from the air supply path 17 via the air flow channel 102 (see FIG. 3), and air is introduced into the gas chamber 340 located on a side toward the gas spring 301 with respect to the lower frame 313 via an air supply hole 327 (see FIG. 16) which communicates directly with the air supply path 17. Thus, the degree of pressure drop on the fuel cell 2 side caused by pressure loss associated with passage of air through the air flow channel 102 is greater than the degree of pressure drop caused by passage of air in the gas chamber 340 (see FIG. 16) of the gas spring 301 which is located on a side opposite the fuel cell 2 with respect to the lower frame 313. As a result, pressure in the gas chamber 340 is higher than pressure in the fuel cell 2. Accordingly, the gas spring 301 presses the fuel cell 2. This pressing can cause the intra-cell laminate or the current collector 49 in the fuel cell 2 to deform in such a manner as to increase a contact area between the anode 31 and the current collector 49 and can cause the cathode 33 or the current collector 48 to deform in such a manner as to increase a contact area between the cathode 33 and the current collector 48. Thus, there can be restrained the occurrence of defective electrical communication between the anode 31 and the current collector 49 and defective electrical communication between the cathode 33 and the current collector 48, which could otherwise result from warpage of the intra-cell laminate (see a curve L4 in FIG. 17).

The provision of the columnar members 331 avoids contact between the upper frame 311 and the lower frame 313. This solves a problem in that the upper frame 311 and the lower frame 313 come into contact with each other and seize in relation to each other at a high temperature. Thus, there can be restrained the occurrence of a situation in which the upper frame 311 and the lower frame 313 in contact with each other seize in relation to each other with resultant crushing of a cavity of the gas chamber 340, thereby restraining the associated occurrence of an impairment in follow-up deformability of the gas spring 301.

Since the columnar members 331 are formed of a metal material, the alumina layer 334 is disposed between the columnar members 331 and the lower frame 313. Thus, there can be restrained the occurrence of a situation in which the columnar members 331 and the lower frame 313 in contact with each other seize in relation to each other with a resultant lower frame 313's failure to deform according to deformation of the fuel cell 2.

Figure 23:
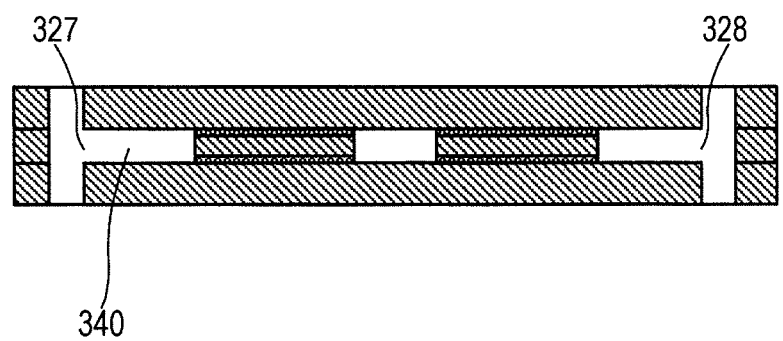
FIG. 23 Sectional view of a gas spring showing an air supply hole 327 and an air exhaust hole 328.

The present embodiment may be modified as follows: as shown in FIG. 23, in the gas spring disposed in the interior of the fuel cell stack, air is introduced into the gas chamber 340 via the air supply hole 327 which communicates directly with the air supply path 17 of the fuel cell stack 3, and introduced air flows through the gas chamber 340 and is discharged from an air exhaust hole 328 which communicates directly with the air exhaust path 18 of the fuel cell stack 3. Since this configuration promotes heat transfer within the gas chamber 340, there can be restrained an increase in temperature of the interior of the fuel cell stack, the temperature of the stack interior having a tendency to increase as compared with the temperature of opposite end portions of the fuel cell stack.

In the above-described embodiment, the gas spring 301 corresponds to the cell-follow-up deformation member in the present invention; the upper frame 311 corresponds to the first metal plate in the present invention; the lower frame 313 corresponds to the second metal plate in the present invention; and the columnar members 331 collectively correspond to the spacer member in the present invention.

Eighth Embodiment

An eighth embodiment of the present invention will next be described with reference to the drawings. The description of the eighth embodiment covers only those features different from those of the sixth embodiment.

The solid oxide fuel cell apparatus 1 of the eighth embodiment is similar to that of the sixth embodiment, except that the columnar members 231 are formed of foam metal (e.g., foam metal of stainless steel or Ni-Celmet).

In the case of foam metal of stainless steel, air may be introduced into the gas chamber 240. However, in the case of foam metal of Ni-Celmet, desirably, hydrogen is introduced into the gas chamber 240, since Ni-Celmet is oxidized by air.

Since foam metal can be crushably deformed, the columnar members 231 of foam metal receive warpage of the fuel cell 2 more flexibly as compared with columnar members of an ordinary metal; thus, there can be restrained the occurrence of a situation in which the columnar members 231 hinder deformation of the upper frame 211 or the lower frame 213. Thus, there can be more reliably restrained the occurrence of defective electrical communication between the anode 31 and the current collector 49 and defective electrical communication between the cathode 33 and the current collector 48, which could otherwise result from warpage of the fuel cell 2.

In the case where, in FIG. 15, a gas spring using columnar members of foam metal of Ni-Celmet (hereinafter, referred to as the foam-metal gas spring) is disposed in place of the gas spring 204, the foam-metal gas spring is in contact with a side toward the cathode 33 of the adjacent fuel cell 2. That is, air is introduced on a side toward the fuel cell 2 with respect to the lower frame of the foam-metal gas spring, and hydrogen is introduced into the gas chamber located on a side toward the foam-metal gas chamber with respect to the lower frame of the foam-metal gas spring. Thus, the pressure of hydrogen introduced into the gas chamber of the foam-metal gas spring is lower than the pressure of air introduced into the fuel cell 2 adjacent to the foam-metal gas spring, so that the fuel cell 2 presses the foam-metal gas spring. Hence, the foam-metal gas spring deforms according to deformation of the fuel cell 2, whereby good electrical communication can be maintained between the fuel cells and the current collectors.

Meanwhile, in the case where the lower frame 213 of the gas spring 204, 205 is deformed in such a manner as to be depressed toward the gas chamber 240, even in a state of seizure between foam metal and the lower frame 213, foam metal can absorb the depression of the gas spring 204, 205, so that contact between the gas spring 204, 205 and the fuel cell 2 can be maintained. In the case where the lower frame 213 of the gas spring 204, 205 is deformed in such a manner as to be expanded toward the fuel cell 2, in a state of seizure between foam metal and the lower frame 213, the gas spring 204, 205 cannot deform (the lower frame 213 remains stuck to foam metal) and thus cannot follow deformation of the fuel cell 2; therefore, electrical contact between the gas spring 204, 205 and the fuel cell 2 cannot be maintained.

By contrast, each of the columnar members 231 of foam metal can have the alumina layer 234 disposed on its side facing the lower frame 213. Since the alumina layer 234 can mitigate seizure between the columnar members 231 of foam metal and the lower frame 213, the follow-up deformability of the gas springs 204, 205 can be maintained more effectively.

Ninth Embodiment

A ninth embodiment of the present invention will next be described with reference to the drawings. The description of the ninth embodiment covers only those features different from those of the seventh embodiment.

Figure 18:
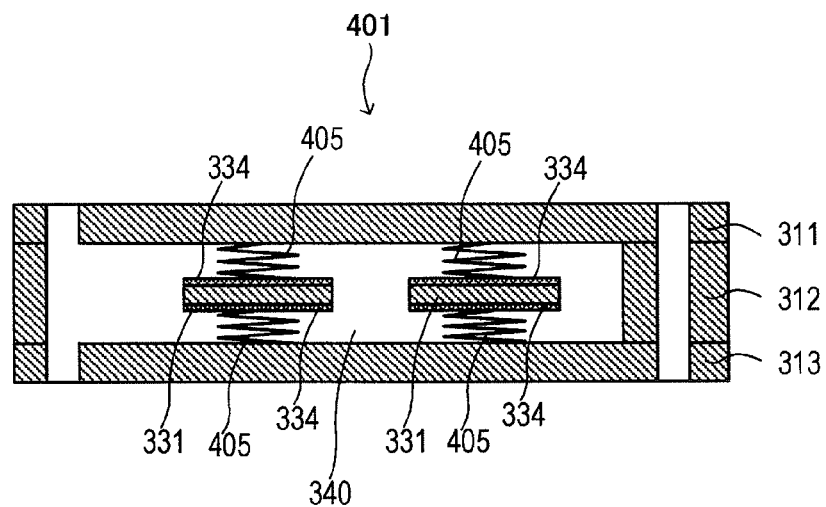
FIG. 18 Sectional view of a gas spring 401 of a ninth embodiment.

FIG. 18 is a sectional view of a gas spring 401.

The solid oxide fuel cell apparatus 1 of the ninth embodiment is similar to that of the seventh embodiment, except that the gas spring 401 is provided in place of the gas spring 301.

As shown in FIG. 18, the gas spring 401 is similar to the gas spring of the seventh embodiment, except that a coil spring 405 of silicon nitride is disposed between the upper frame 311 and each of the columnar members 331 on which the alumina layer 334 is formed and between the lower frame 313 and each of the columnar members 331 on which the alumina layer 334 is formed.

The coil spring 405 is formed by coiling a wire of silicon nitride into a diameter of 20 mm.

In the thus-configured fuel cell apparatus 1, the coil springs 405 complement the follow-up deformability of the upper frame 311 and the lower frame 313, which are deformed by an external force induced by differential pressure between the gas chamber and the fuel cell, whereby the follow-up deformability of the gas spring 401 can further be improved.

In the above-described embodiment, the coil spring 405 corresponds to the urging member in the present invention.

While the present invention has been described with reference to embodiments, the present invention is not limited thereto, but may be embodied in various modes without departing from the technical scope of the present invention.

Specifically, the solid oxide fuel cell apparatus of the present invention may be embodied in the following modes.

(Embodiments Regarding Electricity-Nongenerating Laminate)

For example, the first embodiment is described while mentioning the solid electrolyte 71 of the laminate 70 which is formed of YSZ. However, the solid electrolyte 71 may be formed of a material other than YSZ (yttria-stabilized zirconia), so long as the material is solid electrolyte. Examples of such material used to form the solid electrolyte 71 include ScSZ (scandia-stabilized zirconia), SDC (samaria-doped ceria), and GDC (gadolinium-doped ceria).

The first embodiment is described while mentioning the different-thermal-expansion member 72 of the laminate 70 which is formed of the same material as that used to form the anode 31 of the fuel cell 2; i.e., Ni-YSZ. However, material for the different-thermal-expansion member 72 is not limited to Ni-YSZ, so long as the material has a thermal expansion coefficient different from that of the solid electrolyte 71. Examples of such material used to form the different-thermal-expansion member 72 include Ni—MgO and Ni—CaO.

The first embodiment is described while mentioning the laminate 70 which is accommodated in the accommodation section 73 and is in contact with the upper frame 83. However, when the laminate 70 is not deformed, the laminate 70 may not be in contact with the upper frame 83, so long as, when the laminate 70 is deformed, the laminate 70 can press the upper frame 83.

Figure 19:
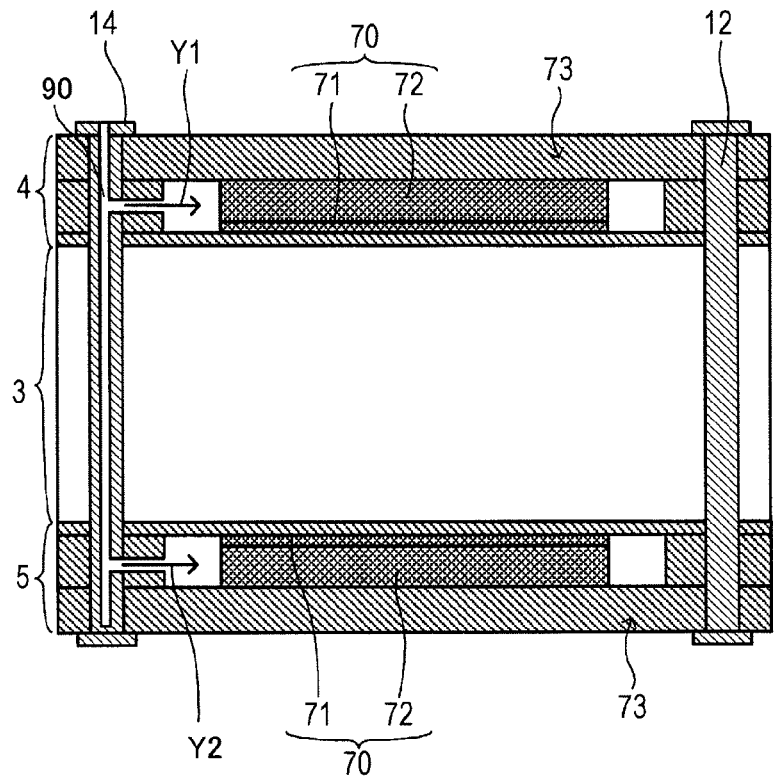
FIG. 19 Sectional view of the fuel cell apparatus 1 for explaining a method of fabricating a laminate 70.

The first embodiment is described while mentioning the procedure in which, after subjection of a laminate of YSZ and NiO-YSZ to a reduction process, the resultant laminate of YSZ and Ni-YSZ serving as the laminate 70 is sealed in each of the end holder members 4, 5. However, the following procedure may be employed: after a laminate of YSZ and NiO-YSZ is sealed in each of the end holder members 4, 5, fuel gas is introduced into the end holder members 4, 5 for exposing the laminate 70 of YSZ and NiO-YSZ to a reducing atmosphere, thereby reducing NiO-YSZ to Ni-YSZ. This procedure is effective for the case where, after the end holder members 4, 5 are assembled to the fuel cell stack, the fuel cells are subjected to a reduction process. That is, the anode of the fuel cells and the different-thermal-expansion members 72 of the laminates 70 can be simultaneously reduced for reduction from NiO-YSZ to Ni-YSZ. The laminates of YSZ and NiO-YSZ sealed in the respective end holder members 4, 5 may be exposed to a reducing atmosphere by means of introducing fuel gas into the end holder members 4, 5 from the fuel gas supply path 15 or by, as shown in FIG. 19, introducing fuel gas into the end holder members 4, 5 from fuel gas supply holes 90 (see arrows Y1, Y2) which are formed in the respective bolts 11-14 along the axial direction of the bolts 11-14 (in FIG. 19, the fuel gas supply hole 90 is formed only in the bolt 14).

The first embodiment is described while mentioning a configuration in which the upper frames 83 of the end holder members 4, 5 are in contact with respective interconnectors 41 of the fuel cells 2. However, either the upper frame 83 or the interconnector 41 may be eliminated for using the upper frame 83 also as the interconnector 41 or using the interconnector 41 also as the upper frame 83. Alternatively, in place of the upper frame 83 and the interconnector 41, a single member may be provided for use both as the upper frame 83 and as the interconnector 41.

The first embodiment is described while mentioning the laminate 70 having the same shape as that of the intra-cell laminate. However, the laminate 70 and the intra-cell laminate may have different shapes.

The first embodiment is described while mentioning a method in which by means of the number of YSZ green sheets of the solid electrolyte 71 and the number of NiO-YSZ green sheets of the different-thermal-expansion member 72, the thickness of the laminate 70 is adjusted for adjusting the strength and warpage of the laminate 70. However, by means of stacking a desired number of NiO-YSZ green sheets of different NiO-YSZ ratios, the Ni content of the different-thermal-expansion member 72 may be adjusted for adjusting the strength and warpage of the laminate 70.

The first embodiment is described while mentioning the different-thermal-expansion member 72 formed of Ni-YSZ; i.e., a material of a mixed composition prepared by mixing a plurality of materials of different compositions. However, material for the different-thermal-expansion member 72 is not limited to a material of a mixed composition. The different-thermal-expansion member 72 may be formed of a single-component material, so long as the material is heat-resistant and has a thermal expansion coefficient different from that of the solid electrolyte 71.

According to the first embodiment described above, the different-thermal-expansion member 72 of the laminate 70 of the cell-follow-up deformation member and the anode 31 of the fuel cell 2 have the same magnitude of warpage (the same degree of deformation). However, the different-thermal-expansion member 72 may be greater in warpage than the anode 31. Since this increases the force with which the laminate 70 presses the fuel cells 2, the laminate 70 can deform the intra-cell laminates or the current collectors 48, 49 so as to increase a contact area between the anode 31 and the current collector 49 and a contact area between the cathode 33 and the current collector 48. As a result, good electrical communication can be maintained between the fuel cells and the current collectors.

(Embodiments Regarding Gas Spring)

The sixth embodiment is described while mentioning the alumina layer 234 formed through application of alumina paste and subsequent heat treatment. However, a method of forming the alumina layer is not limited to application of paste. An ordinary film deposition method, such as sputtering, may be employed.

The sixth embodiment is described while mentioning the alumina layer 234 disposed for preventing the occurrence of seizure between the columnar members 231 and the lower frame 213. However, material is not limited to alumina, so long as the material have electrically insulative properties and heat resistance so as to be able to prevent seizure. For example, a mixed material which contains alumina may be used.

The sixth embodiment is described while mentioning the disposition of the alumina layer 234 for preventing seizure between the columnar members 231 and the lower frame 213. However, in place of disposition of the alumina layer 234, the columnar members 231 may be formed of an electrically insulative material other than alumina.

The ninth embodiment is described while mentioning the coil springs 405 of silicon nitride disposed in the interior of the gas spring. However, material for the coil spring 405 is not limited to silicon nitride. Any heat-resistant material may be used, so long as the employment of one member formed of the heat-resistant material enables the avoidance of seizure-caused contact between the upper frame 311 and the lower frame 313 and the improvement of follow-up deformability of the gas spring 401.

The ninth embodiment is described while mentioning a configuration in which the coil springs 405 are disposed between the upper frame 311 and the respective columnar members 331 and between the lower frame 313 and the respective columnar members 331. However, the following configuration may be employed: the columnar members 331 are eliminated, and the coil springs 405 are directly disposed between the upper frame 311 and the lower frame 313.

Through employment of this configuration, the avoidance of contact between the upper frame 311 and the lower frame 313 and the improvement of follow-up deformability of the gas spring 401 can be achieved by use of one member; i.e., by use of only the coil springs 405.

(Embodiments Regarding Electricity-Nongenerating Laminate and Gas Spring)

Figure 20:
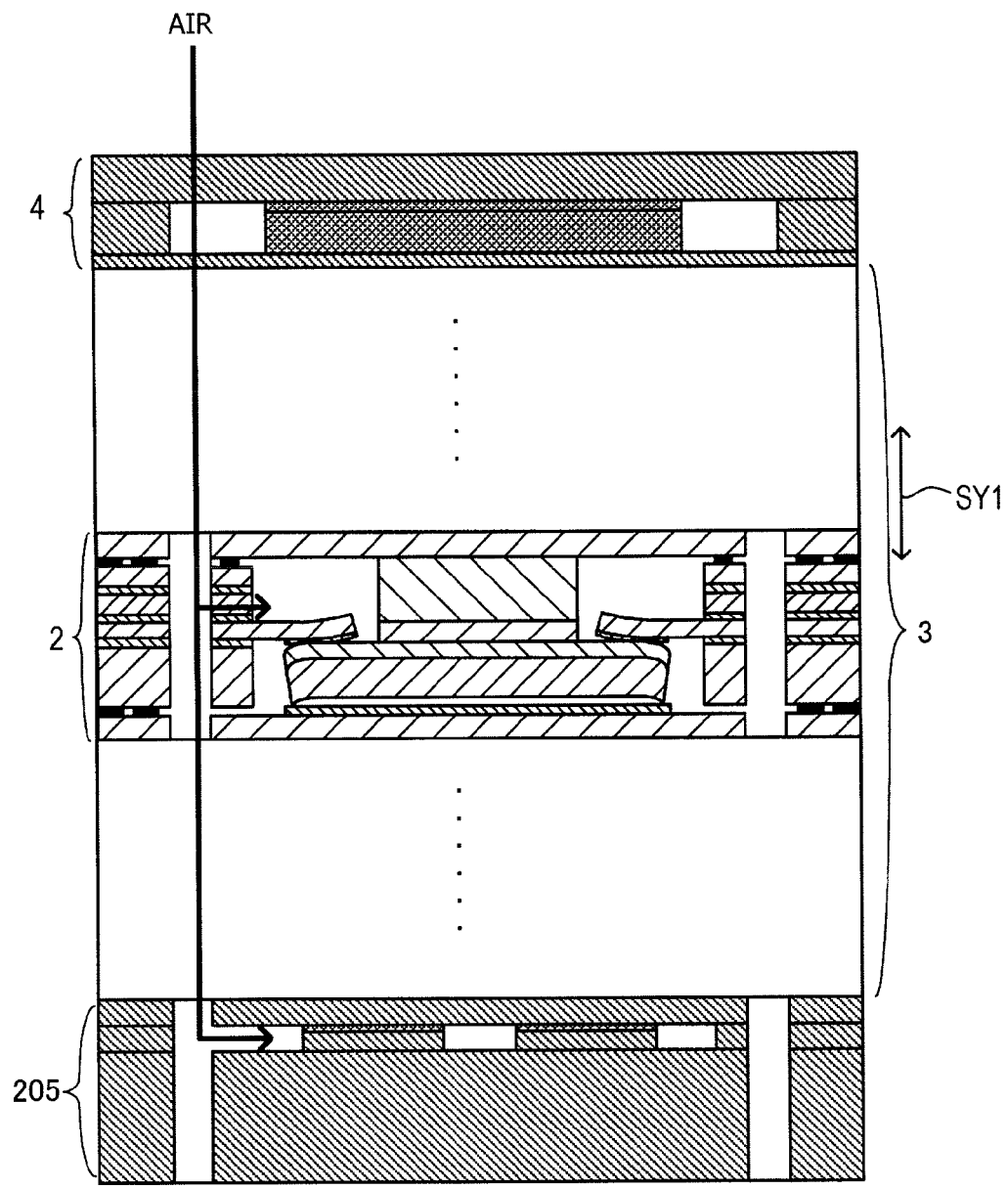
FIG. 20 Schematic sectional view showing the arrangement of the fuel cells 2, an end holder member 4, and the gas spring 205.

The sixth embodiment is described while mentioning a configuration in which the gas springs 204, 205 are disposed at one end and the other end, respectively, with respect to the stacking direction SY1 of the fuel cells 2. However, as shown in FIG. 20, the following configuration may be employed: in place of the gas spring 204, the end holder member 4 is disposed at the upper end of the fuel cell stack 3, and the gas spring 205 is disposed at the lower end of the fuel cell stack 3.

In this case, air is introduced into the gas spring 205 and the end holder member 4. The gas spring 205 is in contact with the anode of the fuel cell located at the lower end of the fuel cell stack. The differential pressure between air in the gas chamber and hydrogen in the fuel cell causes the metal plate intervening between the anode and the gas chamber to deform according to warpage of the fuel cell, whereby the metal plate presses the fuel cell. Meanwhile, the end holder member 4 is in contact with the cathode of the fuel cell located at the upper end of the fuel cell stack. The laminate of the end holder member 4 deforms according to warpage of the fuel cell and presses, in the manner of weight, the fuel cell. In this manner, the fuel cell stack 3 is pressed both from the upper end and from the lower end, thereby avoiding the occurrence of defective electrical communication between the fuel cells and the current collectors, which could otherwise result from a repetition of a thermal cycle, and thus improving the reliability of electrical contact between the fuel cells and the current collectors.

The invention claimed is:

1. A solid oxide fuel cell apparatus comprising:
a fuel cell having
(i) a plate-shaped first solid electrolyte,
(ii) an anode provided on one side of the first solid electrolyte and coming in contact with fuel gas, and
(iii) a cathode provided on the other side of the first solid electrolyte and coming in contact with oxidizer gas; and
a cell-follow-up deformation member located on at least one of opposite sides of the fuel cell with respect to a first stacking direction, SY0, along which the anode, the first solid electrolyte, and the cathode are stacked together, the cell-follow-up deformation member deforming according to a deformation of the fuel cell on the basis of at least one of physical quantities including differential thermal expansion coefficient,
wherein the cell-follow-up deformation member comprises:
an electricity-nongenerating laminate configured such that a plate-shaped second solid electrolyte and a plate-shaped differential thermal expansion member are laminated together, the differential thermal expansion member being provided on one side of the second solid electrolyte and having a thermal expansion coefficient different from that of the second solid electrolyte, and configured so as not to contribute to electricity generation; and
a plate-shaped electrically conductive member in contact with the fuel cell and with the electricity-nongenerating laminate, and
wherein the electricity-nongenerating laminate has the same shape and size as that of a laminate of the first solid electrolyte and the anode.

2. A solid oxide fuel cell apparatus according to claim 1, comprising a plurality of fuel cells in a fuel cell stack,
wherein the electricity-nongenerating laminate is disposed on at least one of opposite sides of the fuel cell stack with respect to a second stacking direction, SY1, along which the fuel cells of the fuel cell stack are stacked together.

3. A solid oxide fuel cell apparatus according to claim 2, wherein the electricity-nongenerating laminate is disposed on each of opposite sides of the fuel cell stack; and
the electricity-nongenerating laminate disposed on one side of the fuel cell stack and the electricity-nongenerating laminate disposed on the other side of the fuel cell stack have the same orientation, the orientation being defined by a direction, SY3, of from the differential thermal expansion member toward the second solid electrolyte.

4. A solid oxide fuel cell apparatus according to claim 2, wherein the electricity-nongenerating laminate is disposed on each of opposite sides of the fuel cell stack; and the electricity-nongenerating laminate disposed on one side of the fuel cell stack and the electricity-nongenerating laminate disposed on the other side of the fuel cell stack have opposite orientations, each orientation being defined by a direction, SY3, of from the differential thermal expansion member toward the second solid electrolyte.

5. A solid oxide fuel cell apparatus according to claim 2, wherein an electrically insulative member is provided on at least one of opposite sides of the electricity-nongenerating laminate with respect to a third stacking direction, SY2, along which the second solid electrolyte and the differential thermal expansion member of the electricity-nongenerating laminate are stacked together.

6. A solid oxide fuel cell apparatus according to claim 1, wherein the electricity-nongenerating laminate is disposed in the interior of the fuel cell stack with respect to a second stacking direction, SY1, along which the fuel cells of the fuel cell stack are stacked together; and the electricity-nongenerating laminate has a region where the second solid electrolyte is not formed on a surface of the differential thermal expansion member which is in contact with the second solid electrolyte.

7. A solid oxide fuel cell apparatus according to claim 1, wherein the second solid electrolyte is formed of the same material as that used to form the first solid electrolyte.

8. A solid oxide fuel cell apparatus according to claim 1, wherein the differential thermal expansion member is formed of the same material as that used to form the anode.

9. A solid oxide fuel cell apparatus according to claim 1, wherein the differential thermal expansion member is formed of a single-component material.

10. A solid oxide fuel cell apparatus according to claim 1, wherein the differential thermal expansion member is formed of a multi-component material.

11. A solid oxide fuel cell apparatus according to claim 1, wherein the differential thermal expansion member is formed such that a plurality of thin films are laminated together.

12. A solid oxide fuel cell apparatus according to claim 1, wherein the differential thermal expansion member is greater in warpage than the anode.

13. A solid oxide fuel cell apparatus comprising:

a plurality of fuel cells in a fuel cell stack, a fuel cell having
(i) a plate-shaped first solid electrolyte,
(ii) an anode provided on one side of the first solid electrolyte and coming in contact with fuel gas, and
(iii) a cathode provided on the other side of the first solid electrolyte and coming in contact with oxidizer gas; and a cell-follow-up deformation member located on at least one of opposite sides of the fuel cell with respect to a first stacking direction, SY0, along which the anode, the first solid electrolyte, and the cathode are stacked together, the cell-follow-up deformation member deforming according to a deformation of the fuel cell on the basis of at least one of physical quantities including differential pressure, wherein the cell-follow-up deformation member comprises:
a first metal plate;
a second metal plate disposed in opposition to the first metal plate;
a central frame arranged between and in contact with both the first metal plate and the second metal plate;
a gas chamber formed by the first metal plate, the second metal plate and the central frame to allow introduction of auxiliary gas thereinto; and
a spacer member disposed within the gas chamber between the first metal plate and the second metal plate and adapted to prevent contact of the first metal plate with the second metal plate, and wherein the cell-follow-up deformation member is disposed in the interior of the fuel cell stack with respect to a second stacking direction, SY1, along which the fuel cells of the fuel cell stack are stacked together, and the cell-follow-up deformation member is configured such that the auxiliary gas can flow through the gas chamber.

14. A solid oxide fuel cell apparatus according to claim 13, comprising a plurality of fuel cells in a fuel cell stack, wherein the cell-follow-up deformation member is disposed on at least one of opposite sides of the fuel cell stack with respect to a second stacking direction, SY1, along which the fuel cells of the fuel cell stack are stacked together.

15. A solid oxide fuel cell apparatus according to claim 13, wherein the spacer member is formed of an electrically insulative material.

16. A solid oxide fuel cell apparatus according to claim 13, wherein the spacer member is formed of foam metal.

17. A solid oxide fuel cell apparatus according to claim 16, wherein the foam metal has an electrically insulative material provided on its surface in contact with the first metal plate and an electrically insulative material provided on its surface in contact with the second metal plate.

18. A solid oxide fuel cell apparatus according to claim 13, wherein an urging member is provided at least between the first metal plate and the spacer member or between the second metal plate and the spacer member.

19. A solid oxide fuel cell apparatus according to claim 13, wherein the spacer member is an urging member.

20. A solid oxide fuel cell apparatus comprising:

a plurality of fuel cells in a fuel cell stack, a fuel cell having
(i) a plate-shaped first solid electrolyte,
(ii) an anode provided on one side of the first solid electrolyte and coming in contact with fuel gas, and
(iii) a cathode provided on the other side of the first solid electrolyte and coming in contact with oxidizer gas; and a cell-follow-up deformation member located on at least one of opposite sides of the fuel cell with respect to a first stacking direction, SY0, along which the anode, the first solid electrolyte, and the cathode are stacked together, the cell-follow-up deformation member deforming according to a deformation of the fuel cell on the basis of at least one of physical quantities including differential pressure, wherein the cell-follow-up deformation member comprises:
a first metal plate;
a second metal plate disposed in opposition to the first metal plate;
a central frame arranged between and in contact with both the first metal plate and the second metal plate;

a gas chamber formed by the first metal plate, the second metal plate and the central frame to allow introduction of auxiliary gas thereinto; and a spacer member disposed within the gas chamber between the first metal plate and the second metal plate and adapted to prevent contact of the first metal plate with the second metal plate, wherein the cell-follow-up deformation member is disposed on at least one of opposite sides of the fuel cell stack with respect to a second stacking direction, SY1, along which the fuel cells of the fuel cell stack are stacked together, and the cell-follow-up deformation member is configured such that the auxiliary gas cannot flow through the gas chamber.

21. A solid oxide fuel cell apparatus according to claim 13, wherein the auxiliary gas is the oxidizer gas or the fuel gas.

* * * * *